Oct. 23, 1934.  E. E. WINKLEY  1,978,004
TRANSFERRING SYSTEM
Filed Feb. 14, 1929  10 Sheets-Sheet 5
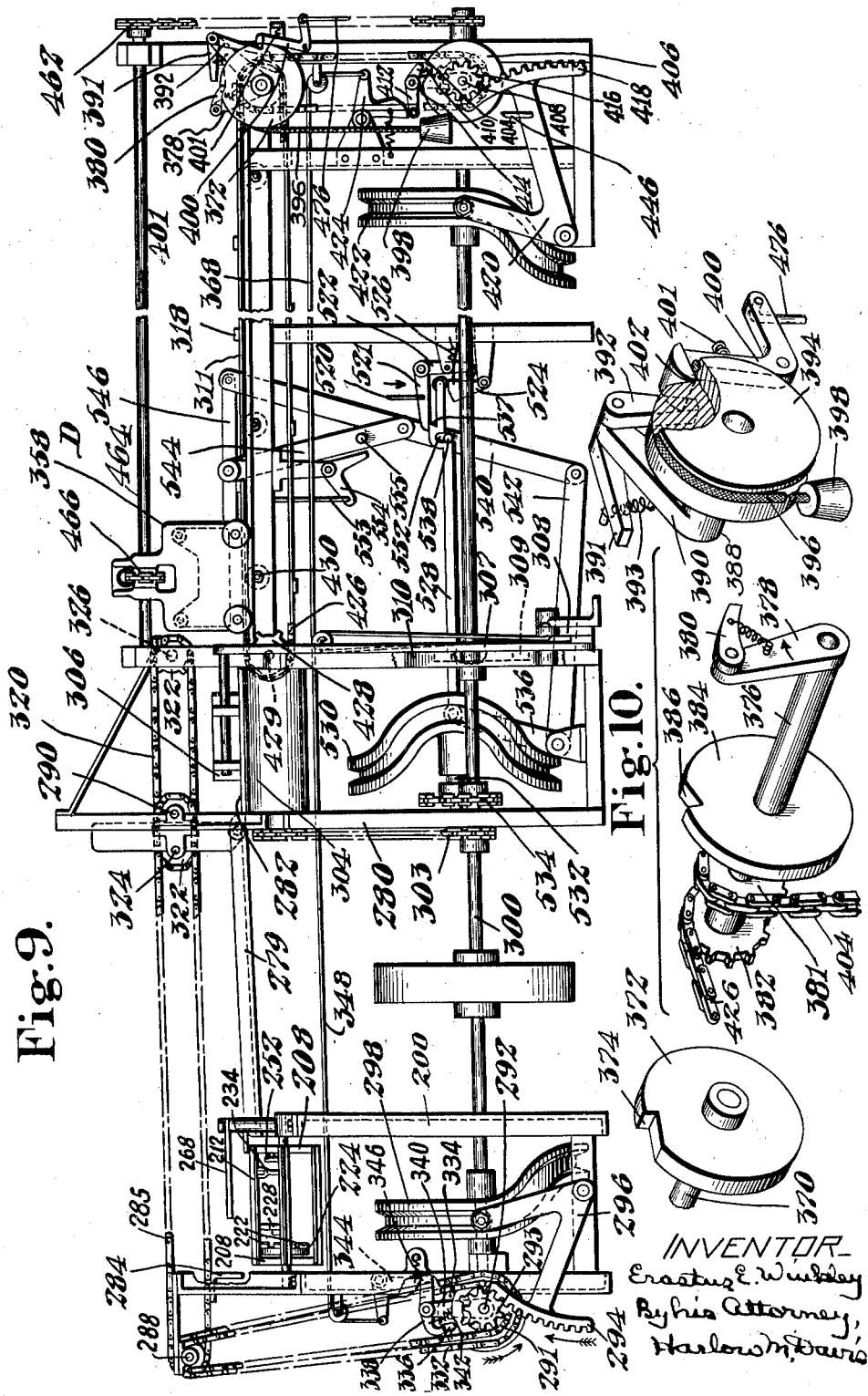

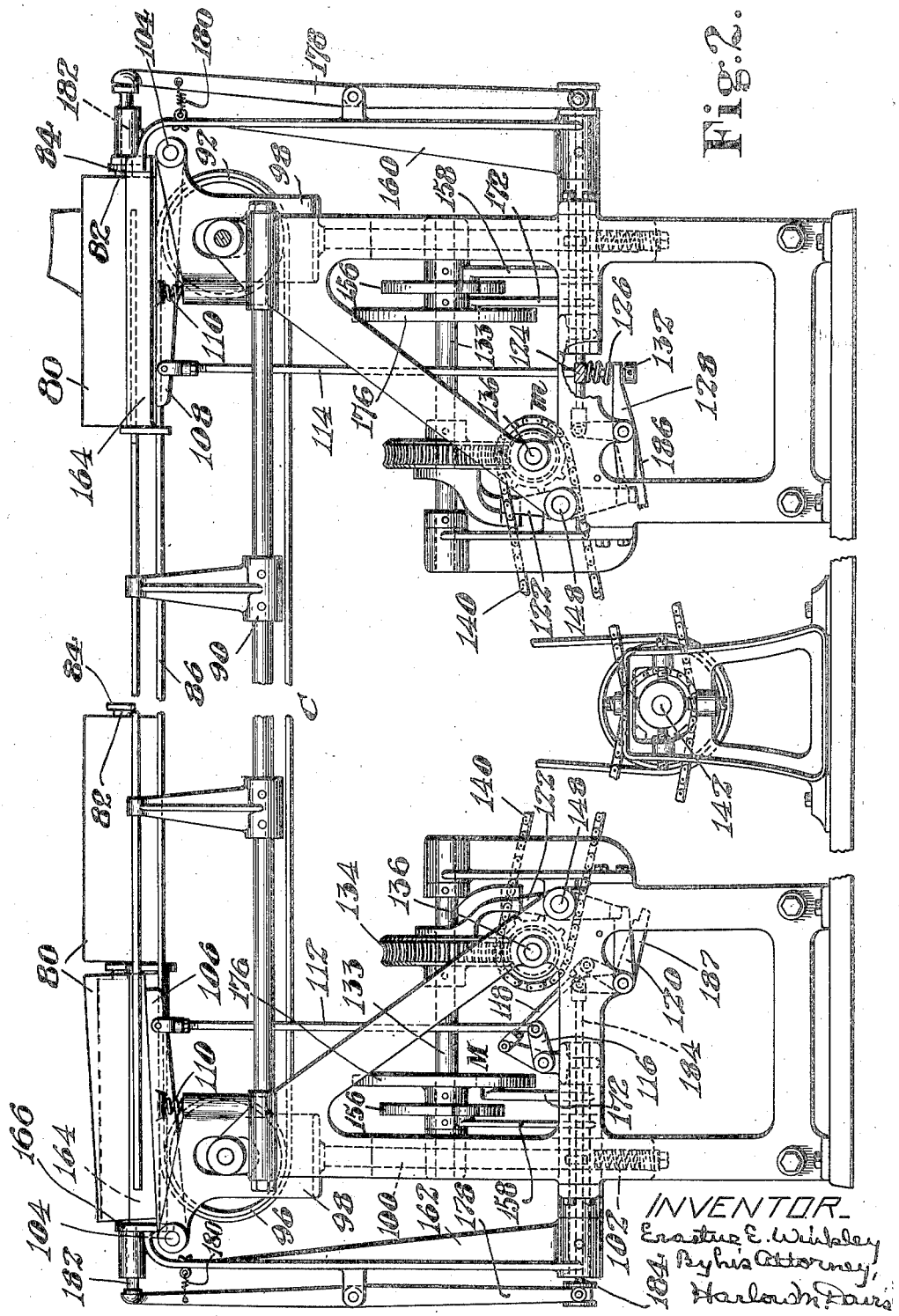

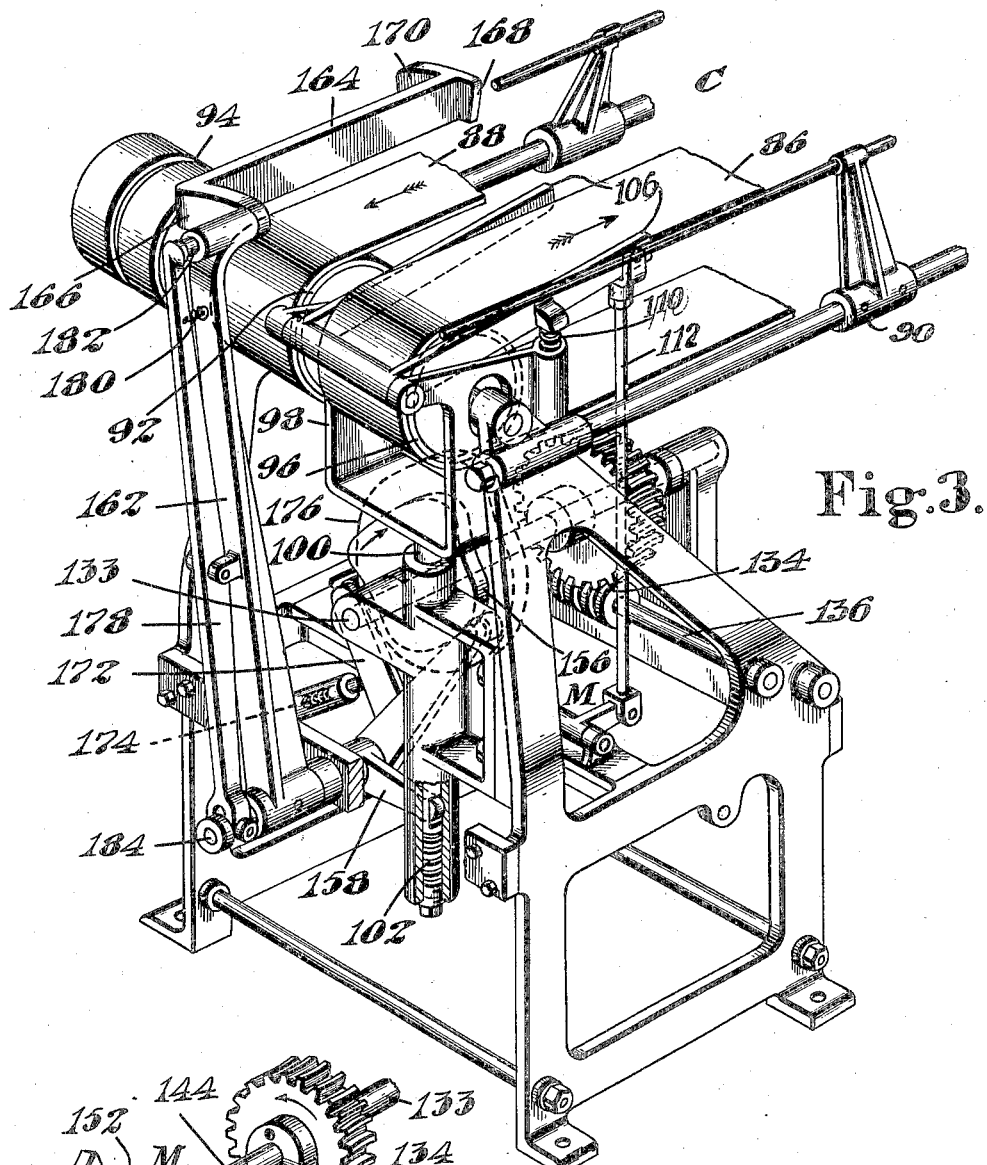
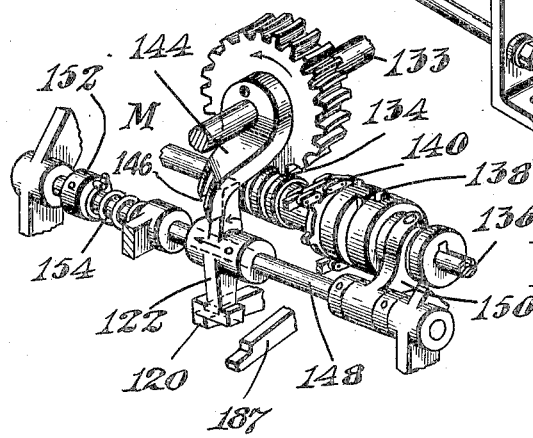

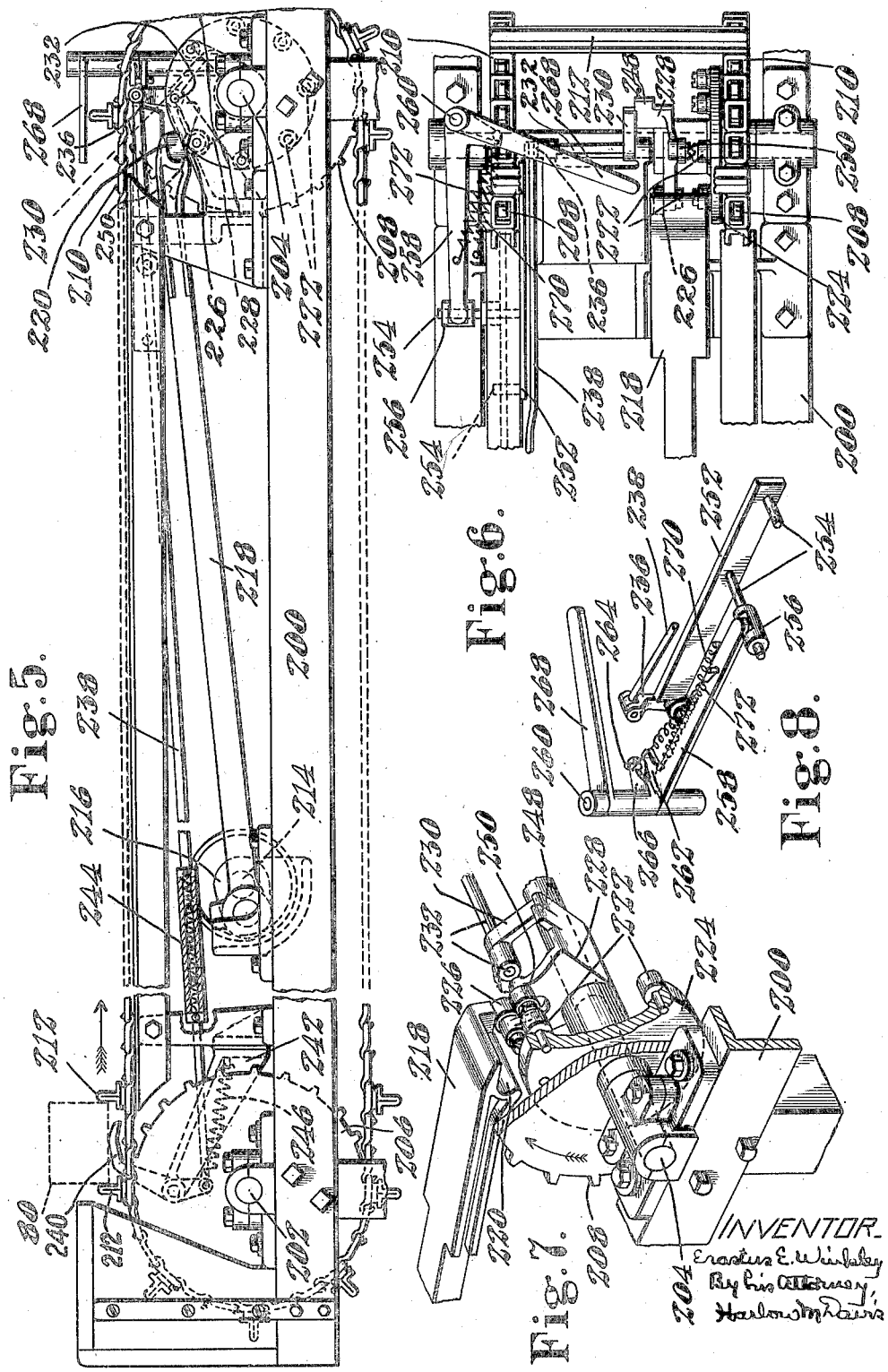

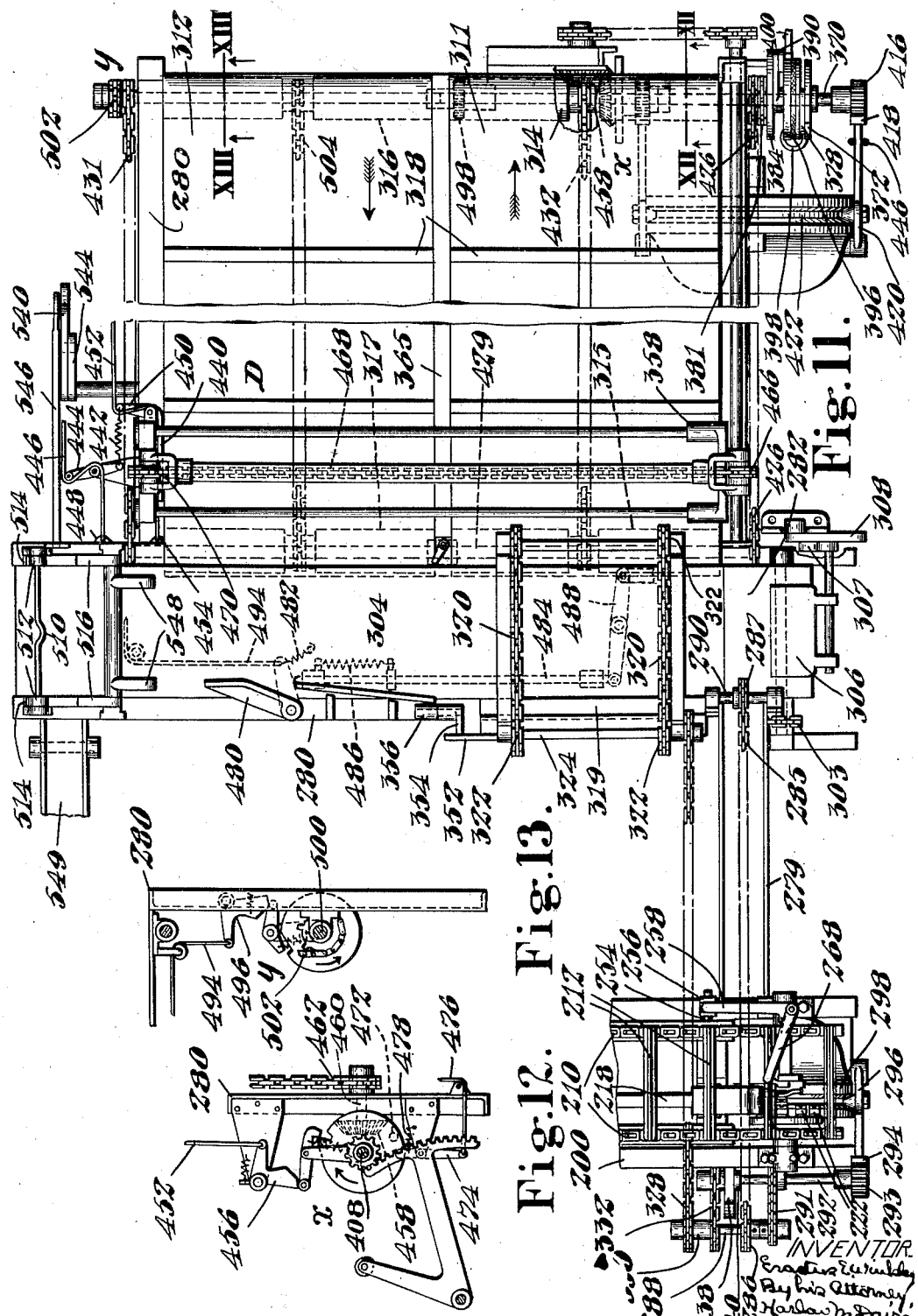

INVENTOR
Erastus E. Winkley
By his Attorney
Harlow M...

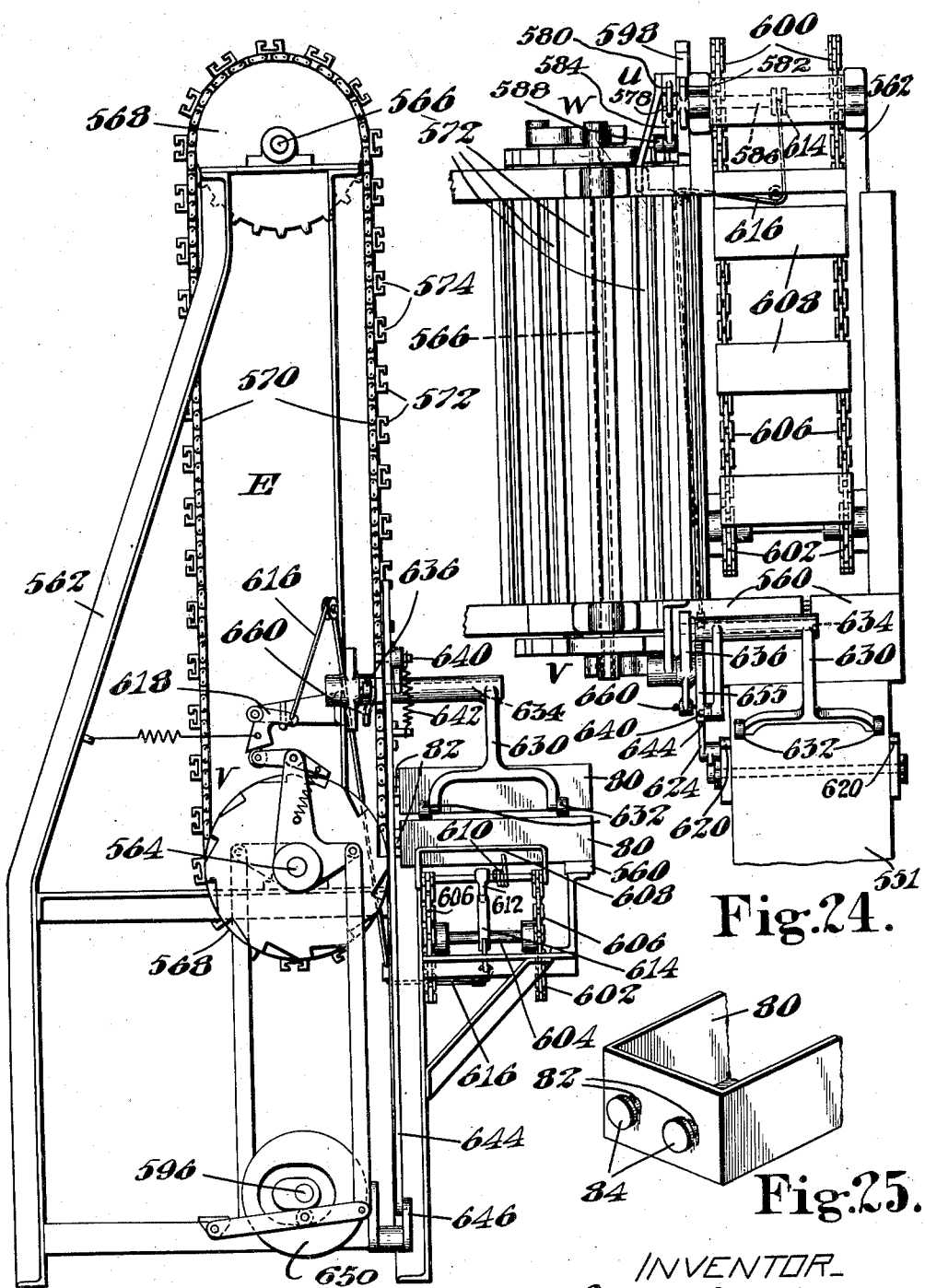
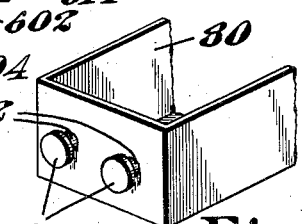
Fig.23. Fig.24. Fig.25.

Patented Oct. 23, 1934

1,978,004

UNITED STATES PATENT OFFICE 1,978,004

TRANSFERRING SYSTEM

Erastus E. Winkley, Lynn, Mass., assignor to United Shoe Machinery Corporation, Paterson, N. J., a corporation of New Jersey Application February 14, 1929, Serial No. 339,882

85 Claims. (Cl. 198—19)

My invention relates to systems for transferring work from one point to another, as from a position in which an operation has been performed upon the work to a succeeding position for a further operation. While the invention is not necessarily so limited, my improved system is of particular utility in connection with the forwarding of shoes in process of manufacture from one operating position, or a section including a plurality of such positions, to another position or section.

In thus transferring work, it is an object of this invention to attain its prompt advance; its protection from injury; the maintenance during its advance of a sequential relation, especially when succeeding operating sections work at different rates, the work throughout the system being received by an operator or operating section in the same order in which the preceding operation was performed; the presentation of the work conveniently for the receiving operator; and the minimizing the handling of the work and its holding or containing means. With shoes, the reason for prompt forwarding is found not only in the obtaining of a high production-rate, but also in the keeping of the work-portions in the best condition to receive the operations. That is, in an operating section in which welting is done, the temper of the welt and the upper should be kept as uniformly as possible at the most favorable degree, and, similarly, in an outsole-stitching section, the proper temper of the sole should be preserved. As to the order in which shoes pass through the system, after an operator has adjusted his machine to act upon a certain type of shoe or has provided it with thread or other material of a particular color or grade, it is desirable that he receive all the shoes of a lot, so that there need be no change in the machine or supplies until this manufacturing order has been completed. The shoes should, of course, be so transferred as to facilitate their handling by the operators and in such a way that they shall not be marred.

In the attainment of this object, there is provided, in novel combination, a plurality of adjacent conveyers combined with automatic means, which may be governed by the articles conveyed, to transfer said articles from one conveyer to another. These conveyers preferably act to deliver articles between sections and to temporarily store the excess of the articles received from one section and which are to be operated upon by another. From this storage, they may be supplied as needed to a slower operator or operating section. The delivery by these conveyors is preferably in the order of reception of the articles. Therefore, there will be no diversion of portions of manufacturing orders, so that all the shoes of a lot having a particular color or a characteristic form may be operated upon without change in the working conditions. In the present instance, a receiving conveyer is shown as leading to an operating position and supplied by transferring apparatus, and two storage-conveyors preferably arranged side by side, to one of which storage-conveyors transferring means delivers articles, while from the other articles are transferred to the receiving conveyor. There is also means for transferring articles from storage-conveyor to storage-conveyor. The last transferring means is most advantageously arranged to travel along the storage-conveyors and with it is associated a feeler or space-testing means to determine when transfer is necessary. This shifting of the transferring means and its control by the condition of the space over a conveyor or by the work on said conveyor, enables me to maintain in the passage of the work through the storage apparatus an unvarying sequence, each shoe or other article arriving at the receiving operator in the same order in which the forwarding operator delivers it. Testing means also best governs the travel of the storage-conveyor which delivers to the receiving conveyor, work being supplied to the latter as a result of this advance of the storage-conveyor, only as the removal of previously delivered articles renders it desirable. Generally, here and throughout the system, the operations of the conveying, transferring or other moving mechanisms is governed by the presence or absence of the work, this in turn controlling the operating means for such mechanisms. In several instances, this automatic control is not limited to storage apparatus.

The inventions embodied in the organizations illustratively disclosed herein, and by which work-pieces and containers therefor are transferred automatically between both extremities of adjacent conveyors, and by which empty containers are stored between operating sections, are made the subject of two divisional applications filed July 1, 1932, the first bearing the Serial No. 620,520 and the second the Serial No. 620,519.

In the accompanying drawings,

Fig. 2 is a broken side elevation of a portion of the transferring apparatus associated with the first section of the system;

Fig. 3 illustrates one extremity of said apparatus in perspective;

Fig. 4 is a perspective view of the clutch mechanism of Figs. 2 and 3;

Fig. 5 shows in broken side elevation a transferring apparatus joining the first and second sections of the system;

Fig. 6 is a top plan view of the delivering end of said apparatus;

Fig. 7 is a perspective view of the operating mechanism of such apparatus;

Fig. 8 illustrates, in perspective, the locking device for the operating mechanism;

Fig. 9 shows the work-storage section of the system in broken side elevation;

Fig. 10 shows separated, in perspective, controlling elements for one of the storage-conveyors and the co-operating carriage;

Fig. 11 is a broken top plan view of the apparatus appearing in Fig. 9;

Figs. 12 and 13 are vertical, sectional details upon the lines XII—XII and XIII—XIII, respectively, of Fig. 11;

Figure 22:
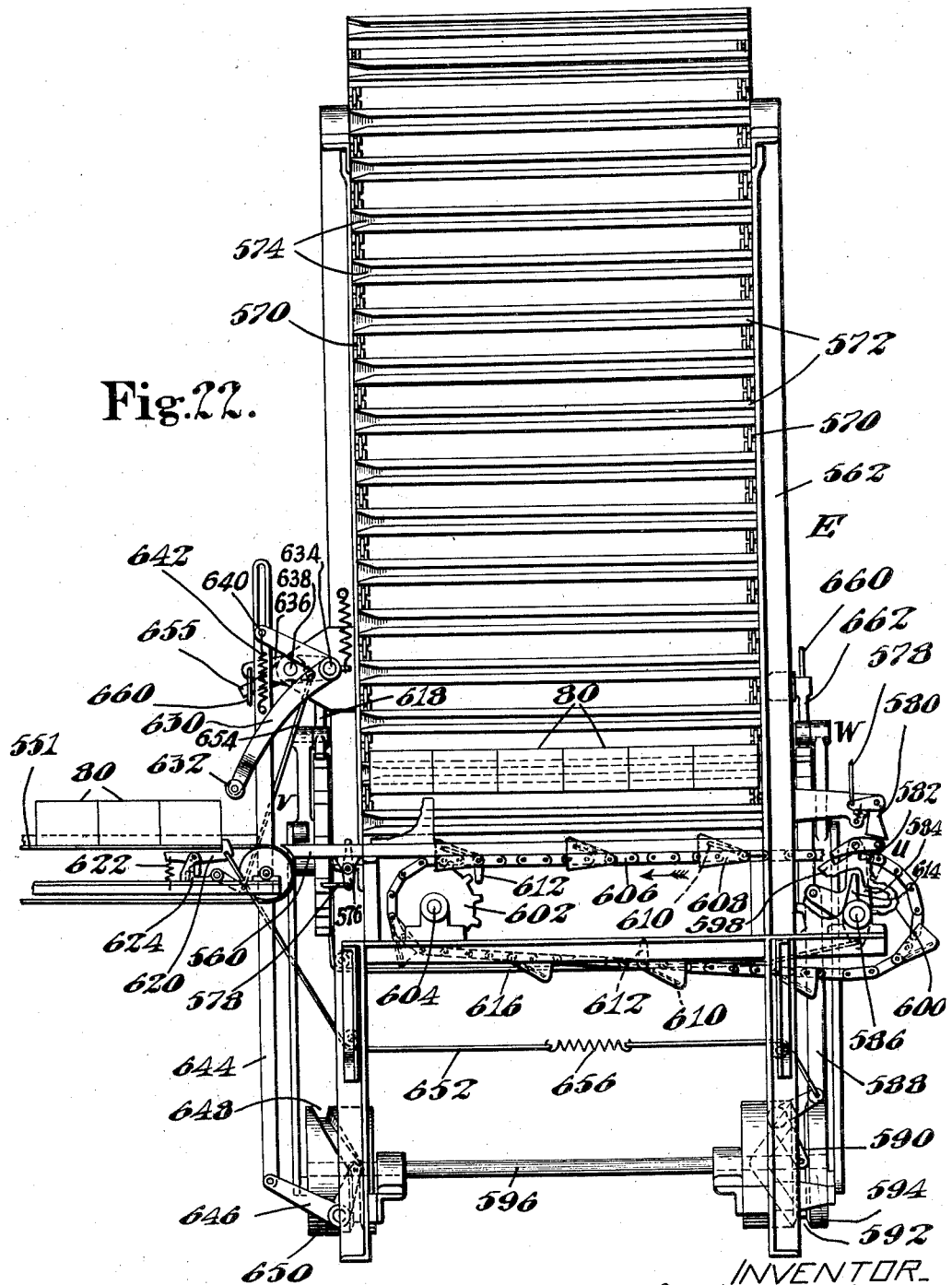

Figs. 16 to 21, inclusive, illustrate diagrammatically different work-movements upon the storage-conveyors;

Fig. 22 is an end elevation of the container-storage apparatus;

Fig. 23 is a side elevation looking from the left in Fig. 22;

Fig. 24 is a top plan view of the apparatus of Figs. 22 and 23; and

Fig. 25 shows, in perspective, a portion of one of the work-containers.

Figure 1:
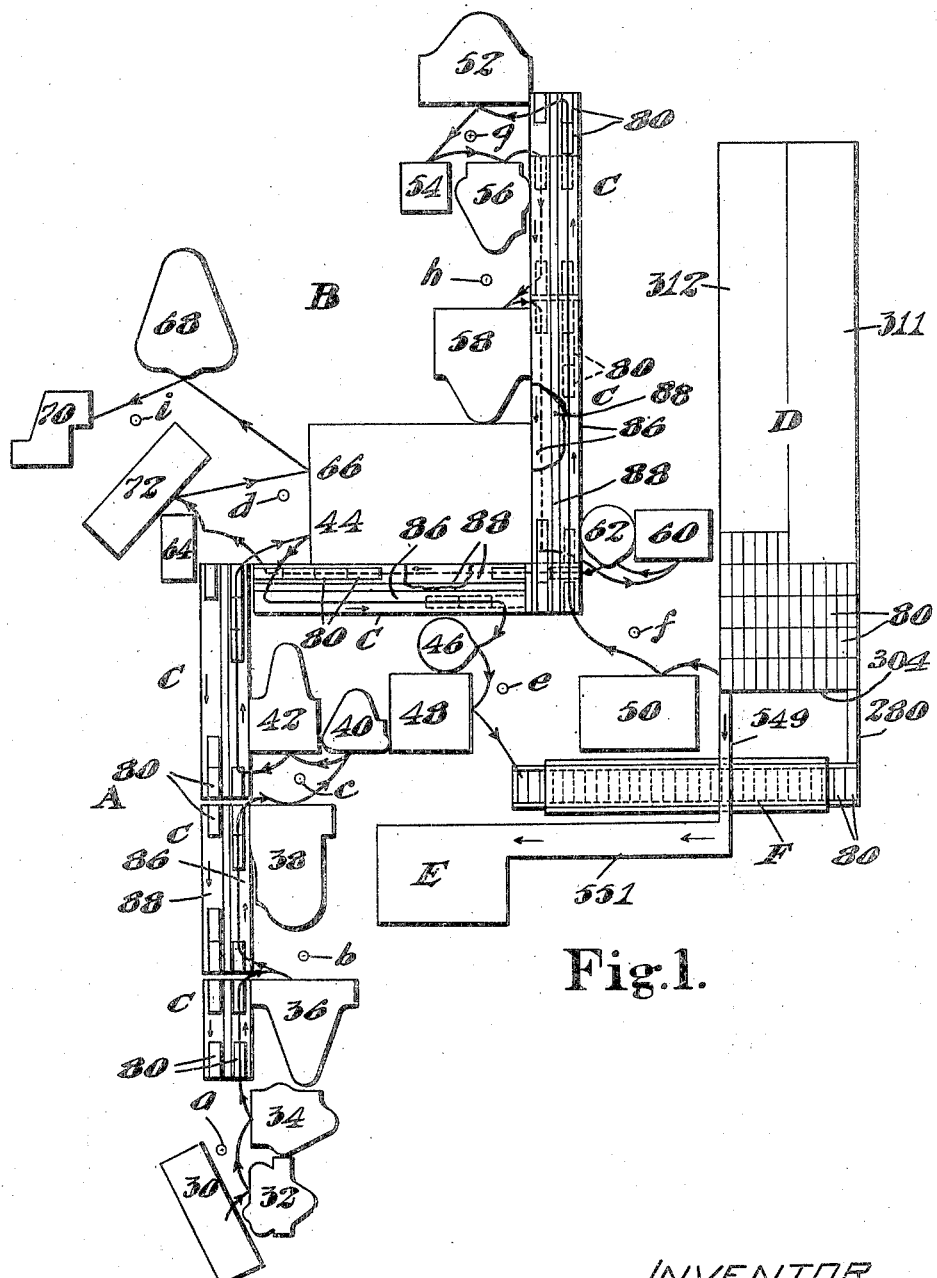
Figure 1 shows diagrammatically a single embodiment of my improved transferring system.

In Fig. 1 of the drawings there is shown diagrammatically a portion of a bottoming room in a shoe-factory, though it is to be understood that this is merely for the purposes of illustration, and that my invention may not only be employed in connection with other shoemaking operations, but for the manufacture of other articles. There appear two successive groups of machines, A and B, the grouping being determined by the number of pairs of shoes upon which each group or section is able to perform its operations in a unit of time. It may be assumed that through section A, pass three hundred pairs of shoes a day, or other working period, while in the second section B, two hundred pairs may be operated upon during the same time. The machines or manufacturing steps in each section, given in the order in which they act upon the work, may be as enumerated below, the sequence and direction of advance being indicated by connecting lines bearing arrowheads. In section A, at which the shoes are received upon racks after lasting, one of which racks is indicated at 30, or through other conveying means the successive operations involve upper-stapling at 32, upper-tack-pulling at 34, welting at 36, inseam-trimming at 38, insole-tack-pulling at 40, welt-butting and tacking at 42, seam-rolling at 44, bottom-cementing at 46, and shank-laying and bottom-filling at 48. In section B, the machines or manufacturing steps include sole-laying at 50, sole-rounding and channeling at 52, channel-opening at 54, shank-reducing at 56, outsole-stitching at 58, shank-pounding at 60, channel-cementing at 62, channel-laying at 64, leveling at 66, heel-seat-nailing at 68, and heel-seat-rounding at 70. The division between the groups is determined by the key-machines, or those which are slowest in operation, these being, respectively, the welter 36 of section A, and the stitcher 58 of section B, these each taking all of an operator's time. The other machines or operations may be arranged in sub-groups which may vary in different embodiments of the system, a plurality of operations, other than the welting and stitching, being attended to by the respective operators indicated by circles designated by the letters a to i, inclusive. It is to be noted that one operator at d acts in both sections A and B, since the same machine at 44, 66 is utilized for the operations of inseam-rolling and outsole-leveling.

Between the successive operating positions, except as to the last four operations of channel-laying, leveling, heel-seat-nailing and heel-seat-rounding, where a rack 72 may be employed, I transfer the work by means of conveyors, the delivery by which is automatically controlled. For protecting the shoes and facilitating their transfer by these conveyors, I prefer to employ containers 80 each holding a single shoe. These containers may be formed of fiber, sheet-metal or other appropriate material, being generally similar in shape to a shoe-box without a cover. Spaced from each other along horizontal lines at one extremity of each container are projections 82, 82 each provided with a head or enlargement 84 (Fig. 25). The purpose of these projections will later appear. The conveyors may be of two types. Between operating positions $a$ and $b$, $b$ and $c$, $c$ and $d$, $d$ and $e$, $f$ and $g$, $g$ and $h$, $h$ and $f$, and $f$ and $d$, transferring apparatus C is illustrated, which may be in each case substantially identical with the others thus designated, each having a delivering conveyor 86 for the containers 80 holding the work upon which an operation has been completed and which is to be forwarded to the succeeding operator, and a conveyor 88 by which the empty containers are returned from the second to the first operator. The pairs of conveyors C differ in length and in that they may be located at different levels. The conveyors between $a$ and $b$, $b$ and $c$, and $c$ and $d$ all move in the same horizontal plane. Between $f$ and $g$ the conveyors 86 and 88 may travel in an upper plane, while those between $g$ and $h$, and $h$ and $f$, are in a lower plane. The conveyors between $d$ and $e$ and $f$ and $d$ operate similarly upon different levels. On account of the 50% higher rate of production in section A over section B, there is interposed between operators $e$ and $f$ a storage apparatus D for boxed work and a storage apparatus E for the empty containers or boxes 80. In addition to this, a drying and transferring conveyor F receives work from the cementing operator at $e$ and delivers it to the storage apparatus D. The apparatus D, E and F will be hereinafter taken up in detail.

A conveying apparatus C will now be described, reference being had to Figs. 2, 3 and 4 of the drawings. At opposite extremes of a frame 90 are journaled in fixed bearings the shafts of rolls 92, 92 carrying, respectively, the delivering or incoming end of the work-conveyor 86 and of the container-conveyor 88. When the adjectives "outgoing" and "incoming" are used to modify the noun "end" applied to a conveyor, it is to be understood that they refer only to such conveyor, defining the direction of travel of its active run. The outgoing end is that from which said run goes out; the incoming end that to which it comes in. Each of the rolls 92, 92 may be separately driven constantly in a direction opposite to the other through a pulley 94. The receiving or outgoing end of each of the conveyors is carried by an idle roll 96 rotatable about the shafts of the rolls 92. Below the receiving end of each conveyor a yoke 98 is borne upon the upper extremity of a vertical rod 100 mounted to reciprocate in the frame and urged normally upward by a spring 102. Pivoted at 104 upon the yokes are pairs of advance-determining arms 106, 108, situated respectively upon opposite sides of and in proximity to the conveyors 86 and 88. Each pair of arms is arranged to yield downwardly upon their yoke against a spring 110 interposed between a socket in the yoke and a lug projecting from the outer side of one of the arms. To one of the arms of the pairs 106 and 108 are joined rods 112 and 114, respectively. The lower extremity of the rod 112 is articulated to a bell-crank-lever 116 fulcrumed upon the frame. This, in turn, is connected by a link 118 to a latch 120 arranged to normally engage a lever 122 which controls actuating mechanism M and which is pivoted above the latch. The rod 114 is guided in a lug 124 on the frame, a spring 126 being interposed between this lug and a latch 128 for a controlling lever 122 for a second actuating mechanism m arranged similarly to that at the opposite extremity of the apparatus. The effect of the spring 126 is to hold the latch 128 normally in engagement with the associated lever 122 to prevent this from operating. The latch is moved away to release its lever by a collar 132 upon the rod 114 when the arms 108 are raised. The mechanism controlled by the lever 122 at each extremity of the conveyors may be identical, being as follows: Journaled longitudinally of the frame at each end beneath the conveyors is a horizontal shaft 133 (Fig. 4) geared at 134 to a transverse shaft 136. The shaft 136 may be rotated through a jaw-clutch 138, the portion of said clutch which is normally loose upon the shaft being driven through sprocket-gearing 140 from a power-shaft 142 (Fig. 2), the latter element being common to both ends of the conveying apparatus. Fast upon the shaft 133 is an arm 144 having a slot 146 to receive the upper arm of the controlling lever 122, the lower arm being engaged by the co-operating latch devices. The lever is fixed to a spindle 148 arranged transversely of the frame for both rotation and reciprocation. Fast upon the spindle is an arm 150 which governs the member of clutch 138 which is splined to the shaft 136. The spindle also carries a fixed collar 152 between which and a portion of the frame extends a helical spring 154. The effect of the spring, when the lever 122 is unlatched, is to move said lever and the spindle bodily and to turn it in the directions indicated by the arrows in Fig. 4. This permits the engagement of the clutch 138 and the release of the shaft 133 for a single rotation. Secured to the shaft is a cam 156 acting upon a bell-crank-lever 158 fulcrumed upon the frame and having an arm engaging the rod 100. The cam in its rotation depresses the yoke 98 and allows the spring 102 to again elevate said yoke. This first lowers the associated arms 106 or 108 with respect to their conveyor and then raises them, their depression causing a container resting upon either pair of arms to be carried forward by the conveyor. The restoration of the arms to normal takes place after another container has arrived over the arms, as will later appear.

Shown as fulcrumed upon the same axis as each lever 158 is a vertically extending transferring arm, designated at the delivering end of the conveyor 86 and at the delivering end of the conveyor 88 as 160 and 162, respectively. The arms and their associated elements may be generally the same and but one will be described. Each arm is provided with a container-engaging end portion 164 extending above and substantially parallel to the delivering end of its conveyor. A horizontal offset 166 joins each end portion to its arm, while at the opposite or rear end are inner and outer horizontally alined lateral projections 168 and 170, respectively. The distance between 166 and 168 and 170 is sufficient to permit the first two of these elements to pass outside the opposite ends of a container 80 held upon the adjacent conveyor, the projection 168 entering the space produced by the container-projections contacting with the succeeding container in the series. The projection 170 temporarily holds said succeeding container from advance by the conveyor. The arm is oscillated across its conveyor, from the normal position illustrated in Fig. 3 to one in which a container will have been shifted from its conveyor to the adjacent conveyor and then the travel of the arm reversed, by an arm 172 fixed to its supporting spindle and maintained by a spring 174 in engagement with a cam 176 upon the shaft 133. Fulcrumed upon each arm 160 and 162 is a lever 178 with its upper extremity drawn by a spring 180 against a plunger 182, which normally projects through the offset 166 in position to be struck and moved by an arriving container. The lower end of the lever 178 is articulated to a rod 184, movable through the tubular mountings of the lever 158, arm 160 or 162 and the arm 172. The inner ends of the rods 184, 184 at the opposite extremities of the conveyors are connected to latches 186 and 187 arranged for engagement with the controlling arms 122 adjacent to their points of engagement by the latches 128 and 120, respectively. Thus each of the respective latches 186 and 187 exercises 128 or 120, with the associated latch, joint control of a lever 122 and therefore of the action of the container-releasing arms 108 and 106 and the container-transferring arms 160 and 162.

The general operation of the conveying apparatus C may now be traced. Assume that there is upon the conveyor 88 a sufficient supply of empty containers 80 to provide the operator at the outgoing end of the conveyor 86 with a reserve in which to place the work, if the production of the succeeding operator chances to fall behind, and that there is an empty container upon the arms 106, and upon the arms 108 another container holding work not yet removed by the receiving operator. The latch 120 is held in engagement with its clutch-controlling arm by the spring 110 and similar engagement of the latch 128 is produced by the spring 126. The latch 186 is also effective, since no container has yet arrived upon the conveyor 86. The latch 187 is freed, because the forward container of the reserve series upon the conveyor 88 is pressing against its plunger 182. Now, when the operator at the outgoing end of conveyor 86 places in the container on the arms 106 a shoe upon which he has completed his operation, the weight depresses the arms and through the rod 112 lowers the latch 120 from the controlling lever 122. This, by its spring 154, is moved to the left, as viewed in Fig. 4, and at the same time is rotated in an anti-clockwise direction. The arm 144 is thus freed and the clutch 138 caused to engage. After the arm is turned through 360° it is again stopped by the controlling lever, the travel imparted by the conveyor 86 being now effective to carry the container to the opposite end of the apparatus. To produce full transferring engagement of the conveyor with the container as the latter lowers the arms 106, the cam 156 causes the depression of the yoke 98 carrying the arms, this permitting the container to rest upon the conveyor and to be moved thereby. After the container has left its receiving position, the cam 176 causes the arm 162 to swing from its association with the conveyor 88 to the inner edge of conveyor 86, shifting the container which has been in engagement with it to the last-mentioned conveyor. The projection 170 retains the succeeding containers of the series on the conveyor 88 from advance until the arm has returned to its initial position, whereupon the series is moved forward by the conveyor until stopped by the offset 166 of the arm, again withdrawing the latch 187. In the meantime, the latch 120 has become effective, because of the restoration of the arms 106 to normal. At the opposite extremities of the conveyors, the container with its shoe, the forward movement of which has just been described, strikes the plunger 182 and moves the latch 186 away from the lever 122 at this end of the apparatus. When the receiving operator takes from the container resting upon the arms 108 the shoe which it holds, the force of the spring 110 is sufficient to raise it. This permits the collar 132 to operate the latch 128 against the force of the spring 126, completing the freeing of the lever 122. The clutch and cam mechanism associated with the incoming end of conveyor 86 therefore act in the manner already described to cause the now empty container to be returned by the conveyor 88, and the incoming container with its work to be transferred from the conveyor 86 to conveyor 88. The latches 128 and 186 have resumed their initial relation. It should be noted that the arrangement of the apparatus is such that the transferring movement at either end of the apparatus cannot take place until the container is ready for transfer, either with or without its contents, according to which extremity is considered, and until the associated conveyor is clear, ready to receive the container to be transferred.

After the operator at e, the last operating position of the first or faster section A, has finished the bottom-cementing, shank-laying and bottom-filling operations on a shoe, he takes a container 80 from the supply at the apparatus E and places the work in it upon the drying conveyor F for transfer to the temporary storage apparatus D on the way to the second or slower section B. The conveying apparatus F is illustrated in Figs. 5 to 8, inclusive. In opposite extremities of a frame 200 are journaled the horizontal shafts 202, 204 of pairs of sprocket-wheels 206 and 208, respectively, upon which operate chains 210. Flights or bars 212 unite the chains, being spaced from one another longitudinally of the conveyor for sufficient distance to admit the containers between them. In the bottom-portion of the frame rotates a constantly driven shaft 214, a cranked portion 216 of which reciprocates an actuating bar 218. The forward extremity 220 of the bar (Fig. 7) has a depression arranged to engage any one of a circumferential series of projections 222 at one side of a disk 224, which is fast upon the shaft 204 with the sprocket-wheels 208, 208. The amount of movement thus produced is sufficient to advance the conveyor a single step toward the final correct presentation, at the delivering end, of a container placed between the flights 212 at the receiving end. Normally, the bar is held out of engagement with the projections 222 by contact of its under side with a roll 226 upon a disengaging member 228 mounted to turn upon the shaft 204. A latching detent 230, pivoted upon the frame, prevents the member 228 from rotating in an anti-clockwise direction (Fig. 7) under the influence of its own weight and that of the bar 218. Projecting upwardly from a spindle 232, upon which the detent 230 is fixed, is an arm 236 joined by a link 238 to a controlling lever 240 fulcrumed upon a frame-bracket 242. An expansible section 244 in the link permits the latter to elongate when its forward extremity is held against movement. The upper end of the lever 240 is curved in the direction of advance of the conveyor, being situated at the outgoing end and held normally above the chains by a tension-spring 246. This upper portion is located between adjacent flights as the conveyor stops after each forward step produced by the actuating bar 218. The weight of a container with a shoe placed in it by the operator at e is sufficient to rock the controlling lever, and, through the connections previously outlined, remove the detent 230 from behind the disengaging member 228. The latter member is thus left free to turn, the extent of movement being limited by contact of a projection 248 from the member with the end of the bar 218. This release permits the bar to be lowered by its weight, so, upon its forward stroke under the influence of the crank 216, its end engages a roll 222 upon the disk 224 carrying the conveyor forward one step. At the same time, the operating end of the bar contacts with a roll 250 projecting from the side of the member 228, this, at the end of the stroke, restoring said member to its normal position, at which it is latched by the detent 230.

It is not desired that the actuating mechanism for the conveyor shall become effective so long as there is at the delivering end a container with its work which has not been disposed of. This is to prevent injury to the conveyed articles because of irregularity in the operation of the transferring mechanism if the removal from the conveyor F be automatic, or from neglect of the operator, if this transfer be manual. To this end, the turning of the member 228 is governed by a locking bar 252. This bar is shown as guided by projections 254 to slide transversely of the conveyor between a position in which it lies in the path of the arm 236, preventing movement by the link 238, and one in which it is at the outer side and clear of the arm. Upon one of the projections 254 is fixed a sleeve 256 slotted to receive the long arm of a bell-crank lever 258 turning about a vertical spindle 260. A short arm 262 of this lever rests against the side of a pin 264 depending from a short arm 266 of a bell-crank lever 268 fulcrumed upon the spindle 260 above the lever 258. A spring 270 joins the pin to a fixed point upon the frame, and a spring 272 extends between the pin and long arm of the lever 258. The upper arm of the lever 268 lies above the incoming end of the conveyor F in the path of the containers upon it, and when the conveyor stops with a container in position for delivery, the contact of said container with the lever 268 moves the bar 252 to the right (Fig. 8) behind the arm 236, thus locking it against movement which will render effective the actuating bar 218. Thus the conveyor remains at rest until an article has been placed upon it at the receiving end and any previously transferred article has been removed from the delivering end. The yieldability of the sections of the compound lever 258, 268 compensates for any excessive movement of the portion 268 by the work, over that permitted by the travel of the locking bar.

The chains 210 of the conveyor F stop with a container and its shoe alined with a trough or track 279 supported upon the frame 200 of conveyor F and the frame 280 of the work-storage apparatus D (Figs. 9 to 15, inclusive). At the opposite end of the track is a receiving table or support 282. To transfer the container from the conveyor F to the table, a bar 284 is reciprocated horizontally at the level of the container by a chain 285 operating over sprocket-wheels 286 and 287 upon shafts 288 and 290, respectively. Sprocket-gearing 291 connects the shaft 288 to a shaft 292, upon which is secured a pinion 293 oscillated through substantially 360° by a gear-segment 294 carried by a bell-crank lever 296 fulcrumed at the bottom of the frame. A cam 298 acts upon the lever and is secured to a constantly driven main shaft 300. The relation between the elements is such that the actuating bar 218 and the transferring bar 284 operate in synchronism continuously, each container carried to the delivering position by the conveyor finding the bar 284 ready to forward it to the table 282 and at once return for the next transfer.

Traveling over rolls 302 (Fig. 14) journaled at the inner end of the opposite sides of the frame 280 is a conveyor 304 constantly driven by sprocket-gearing 303 from the shaft 300, and which effects the direct delivery of work from the table 282 to the sole-laying position at f. Its length is preferably sufficient to permit it to hold at one time twelve containers 80 lying side by side. To advance the containers from the table 282 to the conveyor 304, there slides over the table a transferring head 306, which is pivoted to a lever 307 fulcrumed upon the depending arm of a bell-crank lever 308. A cam-groove 309 in a disk 310 upon the driving shaft 300 oscillates the lever and reciprocates the head in timed relation with the reciprocation of the bar 284, so that, as each delivery is made by the bar to the table, the head pushes the received container upon the conveyor 304, which carries it to operating position f. This is as shown diagrammatically in Fig. 16 for the first container going through the system.

Because the first section A is assumed to have a greater rate of production than the second section B, the containers with their work will gradually accumulate upon the conveyor 304. For the particular case previously outlined, when the operator at e has placed thirty-six shoes upon the conveyor F, the operator at f will have taken twenty-four from the conveyor 304, and twelve will have accumulated on said conveyor 304, which is therefore full; see Fig. 17. At this time, the storage-elements of the apparatus D come into play, and thereafter will act upon the delivery to the conveyor 304 of each group of six, the effect being to maintain, at the incoming end of conveyor 304, delivery in perfect sequence, the shoes being received by the sole-laying operator in the same order they are forwarded by the bottom-cementing operator. In this way, the work entering the system will emerge therefrom in the same relation, and lots into which a day's operations are divided and differing, for example, as to style or color, will be kept together. Adjustments of machines or supplies therefor consequently require to be changed only once for each lot. Extending at right angles to the conveyor 304 are two conveyors 311 and 312 operating, respectively, over rolls 314, 315 and 316, 317, each pair of rolls 314 and 316 and 315 and 317 being axially alined, and all extending horizontally transversely of the frame 280. They are driven under control of the work in the directions indicated by the arrows in Fig. 11. From the portion of the conveyor 304 adjacent to the table 282, the outgoing conveyor 311 receives the containers in groups of six, arranged side by side, and conducts these groups away step by step for transfer to the outer end of the incoming conveyor 312, upon which the groups are carried oppositely in the same manner to the delivering end of the conveyor 304. Their combined length is such that upon them the day's excess production of section A over that of section B may be stored. The actuation of the conveyors 311 and 312 and the effecting the transfer of the work to, between and from them in the desired sequence will now be considered. Flights 318, spaced uniformly upon the surfaces of the conveyors 311 and 312, receive the groups of containers between them and maintain them against accidental displacement.

Figure 14:
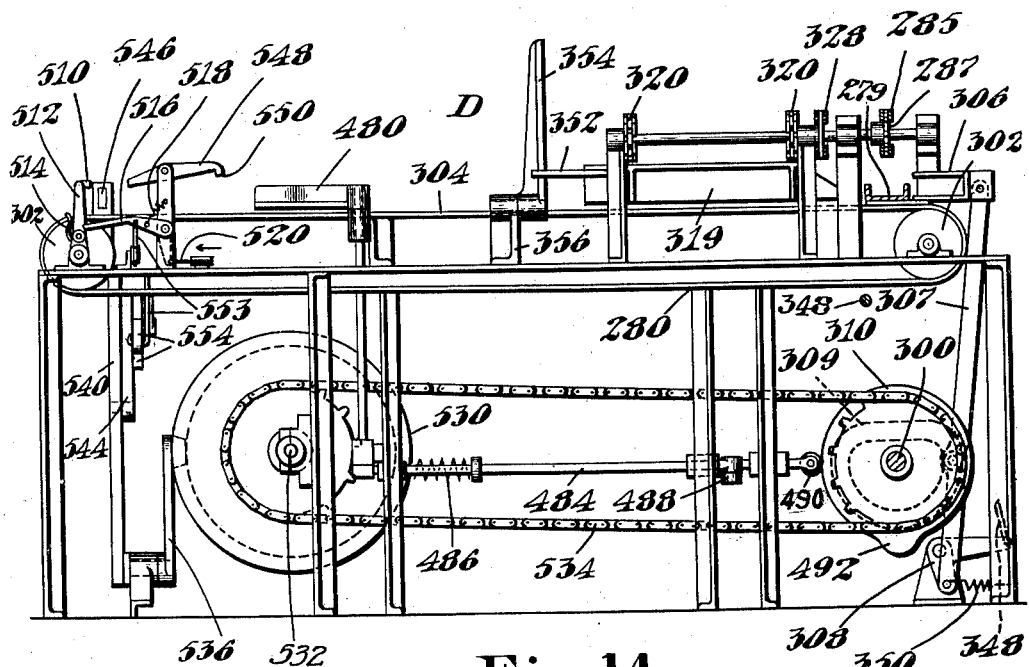
Fig. 14 is a sectional elevation, looking from the left in Fig. 9, of the storage-portion of the system.
Figure 15:
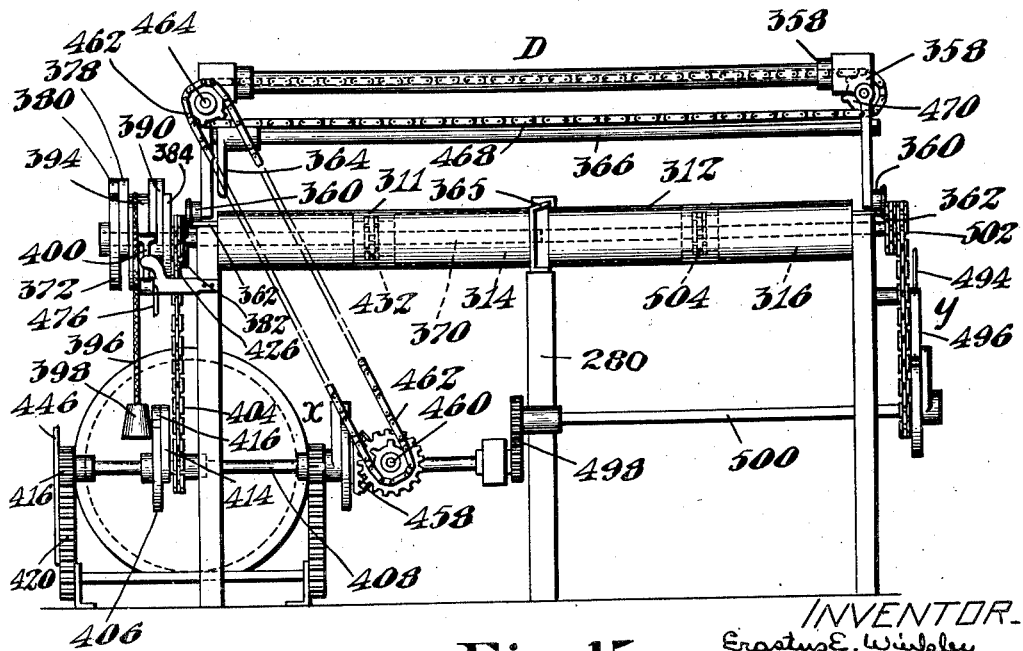
Fig. 15 is an elevation taken in the opposite direction.
Figures 16, 17:
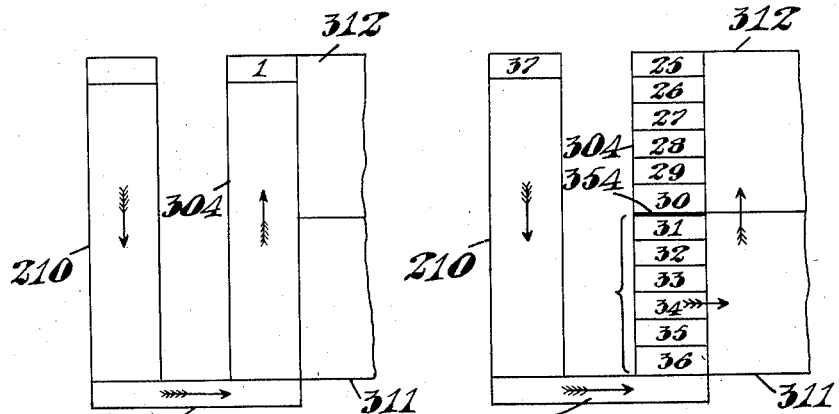

Operating horizontally above the portion of the conveyor 304 near table 282 is a transfer device, consisting of a bar 319 connected at its ends to horizontally extending chains 320, 320 carried by pairs of sprocket-wheels 322, 322 fixed upon shafts 324 and 326. The shaft 324 is united by sprocket-gearing 328 to a sleeve 330, rotatable about the shaft 288 and connected by sprocket-gearing 332 to a disk 334 mounted to turn upon the shaft 292. The disk has a depression 336 to receive the inturned end of a pawl 338 pivoted upon an arm 340 fast upon the shaft 292. The pawl, when opposite the depression, is normally held out of engagement with it against the tension of its spring 342 by the lower extremity of a bell-crank lever 344, which is drawn to the position illustrated in Fig. 9 by a spring 346. This lever is joined by a connection 348, shown as a cord or other flexible member, to the substantially horizontal arm of the lever 308, upon which is fulcrumed the lever 307 of the head 306, which effects the transfer of the containers one by one from the table 282 to the conveyor 304. Normally, since the pawl 338 cannot enter the depression in the disk 334, the arm 340 oscillates idly, this being the condition that obtains when fewer than six containers are upon the conveyor 304 adjacent to the table 282. When, however, the initial full series of twelve containers accumulates on the conveyor 304, or later when there are six containers at the receiving end of said conveyor, the forward travel of the head 306 is resisted. This causes the cam 309, acting through the lever 307, to turn the supporting lever 308 upon its fulcrum against the force of a spring 350, shifting the fulcrum of the lever 307, and at the same time exerting tension downwardly on the cord 348. Thus the restraining arm of the lever 344 is shifted to the left, as viewed in Fig. 9, freeing the pawl 338 so that it drops into the depression 336. The arm 340 now turns the disk, under the influence of the pawl, through approximately 360°, causing, through the intervening connections, a reciprocating movement of the bar 319, which carries the last six boxes from the conveyor 304 upon the conveyor 311, and then returns to its initial position. At this time, the arm and pawl, moving back to normal, cause the tail of the pawl to strike the inclined lower end of the lever 344. This cams the pawl from the depression, freeing the disk 334, which comes to rest. Extending forwardly along the conveyor 304 from the bar 319 is a projection 352 (Figs. 11 and 14). The projection, in the container-shifting travel of the bar, comes into contact with a gate 354 pivoted on a bracket 356 at the end of the frame adjacent to the conveyor. The gate is normally held by gravity in a substantially vertical position, and when engaged by the projection 352 is swung forward and allowed to drop across the conveyor. There, entering the space produced by the projections 82, it separates the group of six containers which is being shifted to the conveyor 311 from the six at the forward or delivering end of the conveyor, preventing interference with the last-mentioned group. After the bar 319 has once acted, the gate remains down until the full period of operation upon the three hundred pairs of shoes has been completed.

As the bar 319 advances to make its delivery, the conveyor 311 travels in the same direction at the same rate, as does also a carriage 358 which extends transversely of both conveyors 311 and 312 and has at its extremities pairs of wheels 360, 360 (Fig. 15) running upon tracks 362 at the opposite sides of the frame 280. Movable longitudinally of the carriage, and therefore transversely of the conveyors, is a transfer-head 364 arranged to slide upon a member 366 of the carriage, the purpose of this head being to shift the groups of six containers from conveyor 311 to conveyor 312. In this action, the containers are carried across an inclined partition 365 situated between the two storage-conveyors. The angle of the partition is such that the containers travel freely from conveyor 311 to 312 and are retained against reverse movement. Control of the movement of the conveyor 311 and the carriage 358 simultaneously with the transferring bar 319 is exercised through a flexible connection 368 to the shifting-fulcrum lever 308 at the same time this lever acts upon the cord 348. The roll 314 of conveyor 311 has secured to the outer extremity of its spindle 370 an actuating disk 372 provided with a peripheral depression 374 (Fig. 10). About the spindle is a sleeve 376, on which is secured an arm 378 having pivoted upon it a pawl 380 for engagement with the depression 374. There is also fast to the sleeve two sprocket-wheels 381 and 382 and a disk 384, in the periphery of which is a depression 386. About the sleeve 376 turns a shorter sleeve 388 provided with an arm 390, upon which is pivoted a pawl 391 for co-operation with the depression 386, said pawl having an arm 392 and being urged normally toward the disk 384 by a spring 393. The sleeve 388 further has fixed to it a drum 394 grooved to receive a cord 396, one extremity of which is attached to the drum, while the other bears a weight 398. A detent 400 is pivoted on the frame and is arranged to enter, under the influence of a spring 401, a depression 402 in the drum and thus prevent its rotation under the influence of the weight. The inner side of the detent 400 extends into engagement with the outside of the pawl-arm 392. The sprocket-wheel 381 is joined by sprocket-gearing 404 (Fig. 9) to a disk 406, normally loose upon a shaft 408 journaled horizontally at the lower portion of the outer end of the frame 280. With a depression 410 in the disk co-operates a pawl 412 pivoted upon an arm 414 fixed to the shaft 408. The shaft is oscillated through a pinion 416 secured to it, and with which meshes a gear-segment 418 upon a bell-crank lever 420 swung back and forth by a grooved cam 422 upon the driving shaft 300. The pawl 412 is held normally out of the depression 410 by a bell-crank lever 424, fulcrumed upon the frame and united by the cord 368 to the fulcrum-lever 308. A sprocket-chain 426 joins the wheel 382 to a sprocket-wheel 428 fast upon a shaft 429, about which turn the rolls 315 and 317, and is connected at 430 to the carriage 358. This, when the pawl 412 is allowed to enter the depression 410, produces travel of the carriage back and forth along the conveyors 311 and 312, movement being communicated to the end of the carriage opposite the chain 426 by sprocket-gearing 431, one of the wheels of which is loose on the spindle of the roll 316 and to the chain of which the carriage is joined. Sprocket-gearing 432 compels the conveyor-rolls 314 and 315 to turn together.

As far as has been described, the storage apparatus D operates in the following manner: When the fulcrum-lever 308 shifts, because of the resistance offered to the movement of the head 306 by the series of twelve accumulated boxes upon the conveyor 304 (Fig. 17), in addition to applying tension to the cord 348 to start the travel of the transferring bar 319, it also pulls the cord 368. This removes the controlling lever 424 from above the pawl 412, which thereupon enters the depression in the disk 406, causing this to be oscillated through one turn and the reverse by the driving segment 418. Movement is communicated through the sprocket-gearing 404 to the sleeve 376, and the pawl 380, engaging the depression in the disk 372, turns this. Since the disk is fast on the conveyor spindle 370, this feeds the conveyor 311 forward one step. The distance corresponds to the width of a group of containers, or the length of one container. At the same time, because of the connections to the sprocket-gearing 426 and 431, the carriage is moved forward at the same rate as the conveyor. During this action, the pawl 391 is in engagement with the depression 386 in the disk 384, its arm 392 being released by the detent 400, which is out of the depression 402 and resting on the periphery of the drum. In the resulting rotation of the outer sleeve 388, its drum 394 winds about it the cord 396, lifting the weight 398. At the termination of forward travel of the conveyor 311 and the carriage, the detent 400 retains the drum by dropping into the depression 402, so the sleeve 388 is controllably held for reverse movement. This movement of the detent, by contact with the arm 392, withdraws the pawl 391 from the depression 386. Succeeding forward steps of the conveyor 311 and the carriage 358 are thereby permitted, without action upon the weight 398. For the first six containers to be transferred by the bar 319, this movement of the carriage 358 is an idle one. For some succeeding group, it becomes initially effective, as will be explained.

Figures 18, 19:
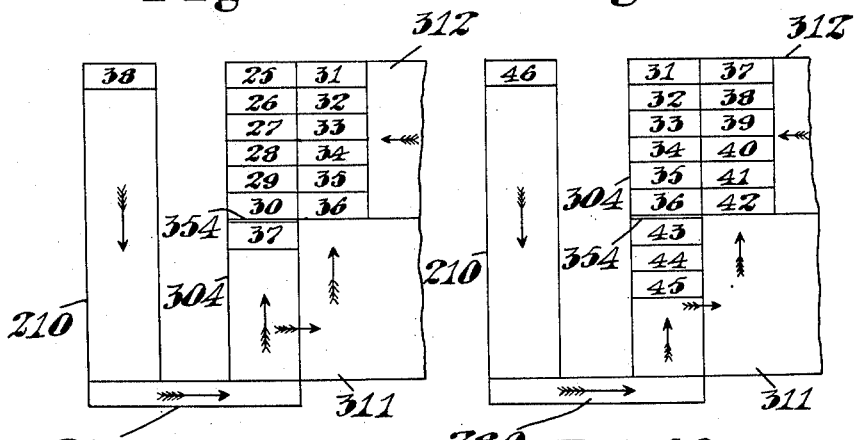
Figures 20, 21:
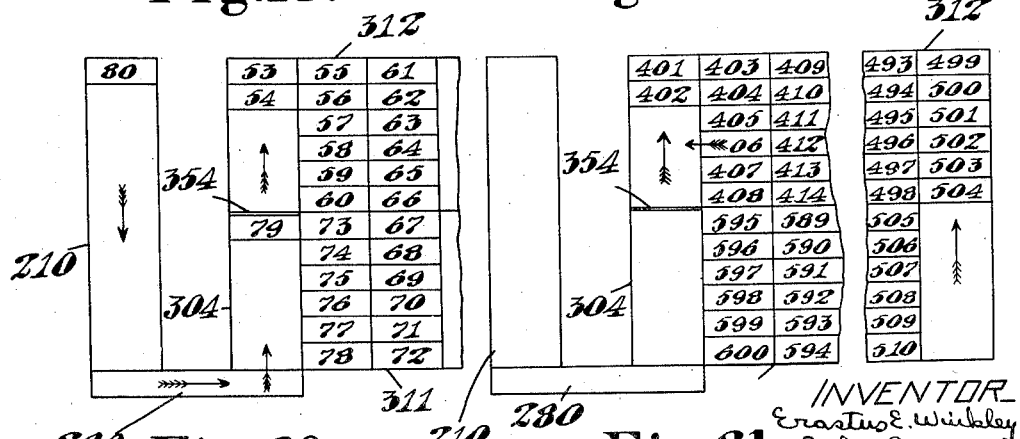

At the end of the carriage 358 adjacent to the outer side of the conveyor 312 is pivoted a feeler or controlling lever 440, connected by a spring 442 to an actuating lever 444 also pivoted upon the carriage (Fig. 11). The feeler is caused to make a test of the presence or absence of containers in its path by a cord 446 leading from a fixed point 448, about the fulcrum and outer extremity of the lever 444, and with its outer end fastened to the bell-crank lever 420 (Fig. 9), which produces the travel of the conveyor 311 and the carriage. At the time when this conveyor and carriage are at rest, the lever 420, during each idle movement, applies force to the cord, which, through the lever 444 and spring 442, yieldably swings the feeler over the conveyor 312. If a group of containers lies in the path of the feeler, it is not moved operatively, the spring 442 yielding. If, however, there are no containers waiting to be advanced by said conveyor, the feeler moves in, and through its arm 450 pulls upon a cord 452 secured to the frame at 454 and at its opposite extremity to a bell-crank lever 456, which controls the operation of mechanism $x$ (Fig. 12), to produce, under the influence of the cam 422, acting at the opposite side from the lever 420 through bevel-gearing 458, a single oscillation of a shaft 460. The mechanism $x$, which includes a driving arm and a driven disk, all free to turn on the shaft 408, is substantially the same as that employed for operating the transferring bar 319 and that associated with the conveyor 311 and the carriage 358, and need not be further described. The shaft 460 oscillates, through sprocket-gearing 462, a shaft 464 journaled longitudinally of the frame 280 at the forward side. Splined to this shaft 464, to rotate with and travel along it, is a sprocket-wheel 466 turning between walls of the carriage. A chain 468 runs over this wheel and a sprocket-wheel 470 at the opposite end of the carriage, and to this chain the head 364 is attached. As a consequence of the connection just set forth, if there are no containers to restrain the testing movement of the lever 440, the head 364 upon the carriage will be reciprocated for the full width of the conveyor 311, said head being restored to its initial position and resting for the succeeding operation. In doing this, a pin 472, projecting from the notched disk of mechanism $x$, engages a lever 474 fulcrumed upon the frame, and to which lever, at the opposite side of the fulcrum from the contact-end, a cord 476 leads to the detent 400. A spring 478 holds the lever 474 toward its normal position during the operating movement of the mechanism $x$. The action of the pin 472 at that time merely produces slack in the cord. In the idle return-movement, however, the spring 478, controlled by the pin, swings the lever clockwise (Fig. 12), applying tension to the cord 476. This withdraws the detent 400 from the disk 394 and causes the pawl 391 to again engage the depression 386 in the disk 384. The weight 398 consequently acts to rotate the sleeve 376, and, by the sprocket-gearing 382, 426, 428, returns the carriage 358, with its transferring head 364, one step. This, in the present instance, is to its initial position adjacent to the conveyor 304. In this action, the pawl 380 travels away from the depression 374 in the disk 372, and is therefore without effect upon the conveyor 311, which remains stationary. The testing action of the lever 440 occurs once for each container delivered upon the conveyor 304. Therefore, when the carriage reaches normal, where it is alined with the group just delivered from the conveyor 304 to the conveyor 311 and comprising the thirty-first to the thirty-sixth containers, another test is at once made. Again, no containers are found on the conveyor 312, so a second movement of the head 364 occurs, transferring the group of containers from conveyor 311 to conveyor 312 (Fig. 18). Upon the accumulation of the next six containers, or the thirty-seventh to the forty-second forwarded from the conveyor F upon the conveyor 304 at the receiving side of the gate 354, the bar 319 will act as before under the control of the shifting-fulcrum lever 308, and simultaneously therewith the conveyor 311 and the carriage will move to the right and return, as in the first instance. Upon test by the lever 440 after this reverse movement of the carriage, containers will be encountered on the conveyor 312, and the head 364 remains at rest. Next, the containers from the forty-third to the forty-eighth arrive on conveyor 311, and the carriage, with the previously delivered group, advances. The test shows no containers on the conveyor 312, they having been transferred to the delivering end of the conveyor 304 by advance of the conveyor 312 in a manner which will be later developed. The head therefore shifts the thirty-seventh to the forty-second containers to conveyor 312 (Fig. 19). The action upon the succeeding groups of containers is similar, save that in each case, when the feeler-lever 440 tests and contacts with a group of containers previously transferred to the conveyor 312, the head 364 is not reciprocated, and the carriage, instead of taking a rearward step, remains at rest, because the detent 400 controlling the carriage-returning weight 390 is not released by the head-reciprocating mechanism $x$. The carriage thereafter goes on with the succeeding group. When the feeler discovers an empty space, caused by the advance of the groups upon the conveyor 312 toward the work-utilizing point at the delivering extremity of the conveyor 304, the test causes the transferring travel of the head, succeeded by a reverse step of the carriage into co-operation with the next group of containers on the conveyor 311. Thus the carriage gradually travels forward, Fig. 20 indicating an intermediate stage, at which the first seventy-eight containers have passed on or are stored in the apparatus D and the next group is gathering. Continuing, the head 364 fills vacant spaces upon the conveyor 312 from the conveyor 311, until the outer ends of these conveyors are reached. Having supplied a group of containers to the last space on the conveyor 312 (Fig. 21), there is a test by the lever 440. Due to the presence of containers, the transfer-head remains inactive and the carriage stationary. When the alined space on the conveyor 312 is vacated, in consequence of the movement of said conveyor as the containers are taken by the operator at $f$, the head supplies it under the control of the testing lever, and drops back a step, to again fill a newly created space at the end of conveyor 312 in the same manner. This continues until all the groups of containers have left the conveyor 311. The active operation of the head 364 is completed for the period, and the carriage returns step by step to its initial position as empty spaces on the conveyor 312 reach it and are tested by the lever 440.

Fulcrumed upon the inner end of the frame 280, with the free end of its testing arm arranged to contact with the second container from the delivering end of the conveyor 304, is a feeler 480 in the form of a bell-crank-lever (Figs. 11 and 14). This lever is acted upon by a spring 482 which forces it toward the path of the containers, but its movement in this direction is normally prevented by a rod 484 guided for horizontal movement in the frame and drawn by a spring 486 against an arm of the feeler-lever. The rod is joined by a lever 488 to a contact member 490 acted upon, once for each container introduced into the storage-system, by a cam-projection 492 upon the disk 310 which actuates the transferring lever 307. By the movement of the rod 484 by the cam, the feeler 480 is periodically freed to test the space over the delivering end of the conveyor 304 to determine the presence or absence of containers thereon. From the feeler 480 a cord 494, or other connecting means, extends and is secured to a bell-crank controlling lever 496 of operating mechanism $y$ (Fig. 13) for the conveyor 312. This mechanism $y$ may correspond to the mechanism $x$ and others already described. It receives movement from shaft 408 (Fig. 15) through spur-gearing 498 and a shaft 500. The notched disk of mechanism $y$ is united by sprocket-gearing 502 to the spindle of the roll 316 of conveyor 312, and sprocket-gearing 504 acts positively to turn the loose roll 317 from its companion. For each container entering the apparatus D, the feeler 480, governed by the cam-projection 492, tests the space above the delivery-section of the conveyor 304 to determine whether all the containers, save the last one of the group at the delivering side of the gate 354, have been removed. When the absence of a container at the tested point allows the feeler 480 to be moved in by its spring, it pulls upon the cord 494. Under the control of the lever 496, the mechanism $y$ operates and advances the conveyor 312 one step toward the delivering section of the conveyor 304, so the groups of containers upon the former conveyor are all carried forward toward the conveyor 304, which thus has delivered to it the terminal group.

After each shoe has been removed by the operator at position $f$ from its container at the end of the conveyor 304, it is desired that the empty container shall be automatically removed from the work-storage apparatus D. The terminal container upon the conveyor 304 is stopped by contact with the inwardly curved central portion of a cross-bar 510 extending between the spaced arms of a lever 512 fulcrumed upon the frame at opposite sides of the conveyor (Figs. 11 and 14). Springs 514 urge this lever 512 inward, so its notched inner side may engage and temporarily retain a bell-crank controlling lever 516 pivoted upon the frame and upon which a spring 518 exerts an upward force. From the lever 516 a cord, or the like, 520 leads to a longitudinal arm 521 pivoted upon a lever 522 (Fig. 9) turning upon the lower portion of the frame 280. In this cord is a connection arranged to reverse the direction in which the stress applied by the lever 516 is exerted. A vertical arm of this lever 522 engages a pivoted controlling member 524 which is held yieldingly against the lever 522 by a spring 526. Riding upon the upper cam-surface of the member 524 is a roll upon the end of a connecting rod 528, which, at its opposite extremity, has a portion entering a cam-groove in a disk 530 fixed upon a shaft 532 journaled horizontally near the delivering side of the frame 280 and driven from the shaft 300 by sprocket-gearing 534. The rod 528 is supported at its point of engagement with the cam by a link 536 pivoted upon the bottom of the frame, the cam 530 effecting its constant reciprocation. When the lever 516 is depressed, the cord 520 holds the arm 521 above the path of a shoulder 537 upon the rod. At the end opposite the cam the rod receives the normal support of the member 524 and, as the roll leaves this, of a pin 538. This pin projects from an operating lever 540, floating upon a link 542 pivoted about the same center as the link 536, and upon a link 544 turning upon the upper portion of the frame. By this mounting, the lever 540 is arranged for substantially rectilinear horizontal movement at its upper end and will communicate this to a horizontally extending plunger 546, the free end of which is movable from a point adjacent to the inner edge of the conveyor 304 across this to the opposite edge.

When a container in the first group received directly upon the conveyor 304 under the influence of the transferring head 306, or in the succeeding groups arriving upon the conveyor 304 by way of the storage-conveyors 311 and 312, reaches the delivering end of the conveyor 304, it passes beneath a double-armed gate 548 pivoted above said conveyor 304, and having its weight so distributed that it is held normally with its rear downturned ends 550 elevated to allow the unimpeded entrance of the container. As this container strikes the depressed forward extremities of the gate-arms it lowers the ends 550, retaining the following containers of the group from interfering with the disposal of the leader. This first container is stopped by the member 510, swinging this outward upon its fulcrum against its springs 514 and releasing the lever 516, so its spaced substantially horizontal arms are lifted by the spring 518 against the container. The weight of the contained work is sufficient to prevent upward displacement of the container and its contents, but when the work is removed the tension of the spring 518 will lift the lever 516 with the container. This draws upon the cord 520 and allows the arm 521 to descend behind the shoulder 537 of the rod 528. In the travel of the rod to the right (Fig. 9), the contact forces the lower extremity of the lever 522 against the member 524, removing this from beneath the roll of the rod 528. The rod is thereby allowed to fall, so that a depression 552 in its under side engages the pin 538. The reciprocation of the rod by the cam 530 thereupon moves forward the plunger 546, which pushes the container from its position upon the lever 516 to a conveyor 549, so located and driven that its upper receiving run delivers to feeding conveyor 551 of the container-storing apparatus E. Upon the return movement of the rod 528, the upper surface of the member 524 cams up the rod-roll, so the depression 552 is lifted above the pin 538, freeing the lever 540 and leaving it in its initial relation. To an arm of the lever 516 is secured a cord or other connecting member 553, with its opposite end attached to a bell-crank-lever 554 fulcrumed adjacent to the supporting link 544 of the operating lever 540. When the plunger 546 is moved forward, a pin 555 projecting from the link displaces the bell-crank-lever 554 and slackens the cord 553. On reverse movement the pin swings the lever upon its fulcrum in an anticlockwise direction (Fig. 9), drawing upon the cord and lowering the lever 516. This lever is thereupon engaged by the depressions in the lever 512 and latched in its normal position ready for action upon another container.

Similarly to the containers in the various apparatus C, those associated with the apparatus D are to remain in a closed circuit, being used, after their contents have been removed by the operator at $f$ at the beginning of the second section B, to receive the work of the operator at $e$ in the first section A. At such times as the operator at $e$ does not use containers directly from the conveyor 551, it is desirable to dispose of the others in an orderly manner, so that at the end of a day, or other working period, all the containers used in the apparatus D to convey shoes to the operator at $f$ shall be arranged conveniently for utilization by the operator at $e$ when the succeeding period begins. The apparatus E for this purpose is particularly illustrated in Figs. 22, 23 and 24. The conveyor 551 carries the containers to a point in proximity to a table 560 supported at one side of frame 562 of the apparatus E. Rotatable in the frame beside the table is a horizontal shaft 564, and spaced from this, being shown as above it, is a shaft 566 journaled in the frame (Fig. 23). Secured to the shafts, respectively in a plane adjacent to the receiving end of the table and in a plane spaced therefrom across the apparatus, are pairs of sprocket-wheels 568, 568 upon which operate sprocket-chains 570, 570. Extending horizontally between the chains and being distributed about them in a series, are container-receiving and carrying bars 572, each having at its outer side a channel 574 formed to receive and temporarily retain the headed projections 82 of the containers. These chains and bars furnish a storage-conveyor. The length of the respective bars may be such that six containers will be received by each. At the close of a working period the carrier-bars support, within a relatively small floor space, the entire two hundred containers which are provided for use in the apparatus D to care for the shoes forwarded from section A before the operators of section B are ready to work upon them.

When the operator at $e$ begins his work, he will find one of the bars 572 held by the chains 570 just above the table 560. To receive the first shoe he slides out from this bar the container next to the table, or that at the left in Fig. 22. In the path of the container thus removed is the upper extremity of a lever 576 fulcrumed below and extending through an opening in the table. The resultant tilting of the lever by the container draws upon a cord or connecting member 578 leading from said lever to a bell-crank controlling lever 580 fulcrumed upon the opposite side of the frame 562. The controlling lever is thereby caused to release a pawl 582, of an operating mechanism $u$, which is pivoted upon one arm of a bell-crank-lever 584 turning upon a horizontal shaft 586. The lever 584 is oscillated continuously through connections including a vertical link 588, a bell-crank-lever 590 pivoted near the lower portion of the frame, and a peripheral cam-groove 592 in a disk 594 secured to a shaft 596 turning in the lower part of the frame and driven constantly. Thus freed, the oscillating pawl 582 enters one of a regularly spaced series of depressions about the periphery of a disk 598 fast upon the shaft 586, which also has secured to it two sprocket-wheels 600, 600. The wheels are so spaced that they lie near the ends of the containers in the series under consideration, or that carried by the bar directly cooperating with the table. Upon these wheels, and another pair of wheels 602, 602 fastened to a shaft 604 near the table, run a pair of sprocket-chains 606, 606. Between the chains are pivoted a series of contact-bars 608 each spaced from those adjacent to its opposite sides by the width of two containers. The bars may be of channel-shape (Fig. 23), with rounded upper edges urged by springs 610 toward the containers carried by the bar cooperating with the table. The bars 608 are arranged in three groups, each group acting upon the containers of a bar 572. As the operator removes each container from the forward end of the bar adjacent to the table 560, the movement by the container of the lever 576 will start the mechanism $u$ in operation, carrying the outer bar 608, or that at the right of Fig. 22, against the adjacent end of the series of containers in the direction indicated by the arrow and forcing them all toward the table by the width of one of said containers, thus presenting convenient to the hand of the operator the next one which is to be utilized. The bars which are below and in contact with the containers yield against their springs, the rounded upper edges preventing their catching. When the lever 584 makes its return stroke, after advancing the series of containers, engagement of the pawl 582 with the inclined lower end of the controlling lever 580 cams said pawl away from the disk 598 and the travel of the bars 608 ceases.

The removal of the containers goes on until the operator at $e$ has used the entire six upon the holding bar alined with the table. At such time a contact finger 612, projecting from the chains 606 and of which there is one for each group of bars 608, comes in engagement with the upwardly extending arm of a lever 614 arranged to turn upon the shaft 586. To the lower arm of the lever is fastened a connecting cord 616 which leads to a bell-crank-lever 618 (Fig. 23). The lever 618 controls an operating mechanism $v$ actuated from a cam-groove in the outer end of a disk 650 fast upon the shaft 596. This mechanism may be of the same general character as the mechanism $u$, and acts upon the shaft 564 to lower, a distance equal to the space between the bars 572, the runs of the chains 570 at the side toward the table 560, thus bringing a bar filled with containers into position for their removal by the operator.

As the operator at $f$ works upon the shoes which the operator at $e$ forwards to him, the containers which he empties will accumulate upon the conveyor 551 at the apparatus E. Here they are stopped, with the leading container at a point somewhat removed from the table 560, by the upturned end of a double gate-lever 620, 620 fulcrumed upon the frame below and at opposite sides of the conveyor 551. A spring 622 holds the gate normally in the path of the containers, it being normally retained against reverse movement by a spring-actuated latch 624 pivoted below the gate. Mounted to oscillate over the table is a container-feeding lever 630, having at its lower extremity a yoke at the opposite ends of which are container-engaging rolls 632. This feeding lever is fulcrumed at 634 upon a carrier-lever 636, which, is, in turn, fulcrumed at 638 upon the frame 562. The upper arm of the lever 630, which is of the bell-crank type, has projecting laterally from its outer end a pin 640, which is held by a spring 642 against the lower extremity of a slot in a vertical link 644 joined to a bell-crank-lever 646 fulcrumed at the bottom of the frame. This lever 646 is continuously oscillated by a cam-groove 648 in the periphery of the disk 650. The feeding lever is thus in constant operation, its rolls moving so they will descend to contact with a container upon the table to push it from said table so the container-projections 82 will enter a bar-channel 574. The feeding lever then travels rearwardly from the delivered container to its initial position. Periodically, once after each advancing movement of the containers in a series by the mechanism $u$, the gate 620 is lowered, to permit the conveyor to deliver a container to the table 560, by a flexible connection 652 to the lever 590 of the mechanism $u$. This gate-withdrawal can take place only when the feeding lever 630 has acted and the way is free for the advance of the containers. The latch 624 at other times restrains the gate, it being withdrawn by a cord or connection 654 when the feeding lever is elevated. This cord 654 is joined at the extremity opposite the latch to a lever 655 arranged to turn about the fulcrum 638. The outer arm of this lever lies in the path of the pin 640, which contacts with it only after the lever 630 has made a full feeding stroke. Thus, after the table 560 has been cleared as a result of the forward movement of said lever, the latch is drawn down and held against return by a partial release of the gate 620, the outer tail-portion of which now rests against the under side of a container 80 or the conveyor 551. The periodic pull on the cord 652 may now fully depress the gate in the proper time-relation. As the gate frees the terminal container, the tail-portion rises and retains the succeeding containers against forward travel, until the gate is again elevated to stop the advance. An extensible section 656 included in the connection 652 allows tension to be applied to said connection while the gate is still latched.

The operator at $e$ takes the containers 80 from the presented bar 572 while the feeding lever is elevated and the way is thus clear, or he may remove them from the conveyor 551. Each time the gate 620 is lowered, the forward container, which may be against said gate upon the conveyor 551, is forced forward upon the table 560, and the lever 630 descending feeds it into place upon the alined bar 572, pushing back the other containers in this series which have been advanced by the chain-bars 608 from the opposite end. If this storage-bar 572 is already full, either because it has been supplied by the lever 630 from the conveyor 551, or because a full bar has been brought into place from above by the mechanism $v$ when the operator emptied the bar below it, the completion of the feeding stroke is prevented by the contact with the outside of the end container. Continued action of the mechanism reciprocating the link 644 transfers the fulcrum of the feeding-lever system from 634 to 638, the lever 630 being lowered bodily by the turning of the lever 636. At this time the spring 642 may yield sufficiently to avoid injury to the engaged containers. In this movement, a connection 660 to the outer extremity of the lever 636 shifts a controlling bell-crank lever 662 to start the action of operating mechanism $w$, of the same character as mechanisms $u$ and $v$ and located at the opposite side of the frame. The mechanism $w$ receives power from a cam-groove at the end of disk 594. The shaft 564 is rotated through the mechanism $w$ from the shaft 596 sufficiently to raise the active side of the storage device, this being in the opposite direction to that in which it was shifted by the mechanism $v$ to present full bars 572 to the table. This brings from below, into direct co-operation with the table, an empty bar to receive the containers advanced by the lever 630 from the conveyor 551. In this manner, as long as there are containers upon the conveyor and there is a space unfilled in a bar alined with the table, a transferring action will be maintained and the supply in the empty bars will be renewed. At all times there is provided in the storage apparatus E a supply of containers for the more rapidly working operator $e$ and space to receive the containers delayed in their travel by the slower operator $f$.

Having thus described my invention, what I claim as new and desire to secure by Letters Patent of the United States is:

1. The combination with conveyors arranged adjacent to each other, of means movable to transfer articles from one conveyor to another, and controlling means for the transferring means, said controlling means including a member actuated responsively to a change in the total weight of articles, and a member actuated by the travel of the articles under the influence of a conveyor for controlling the actuation of the first-mentioned member.

2. The combination with adjacent conveyors, of a member arranged to transfer articles from one conveyor to another, means for moving the member and including a support movable longitudinally of both conveyors and upon which said member is movable back and forth transversely of the conveyors in effecting the transfer, and controlling means for the transferring member mounted upon the support.

3. The combination with adjacent conveyors, of a member arranged to move articles from one conveyor to another, means for moving the member in contact with the articles on one conveyor to effect their transfer to the other conveyor, and a movable controlling member for the moving means associated with a conveyor and governed by a change in the total weight of the articles conveyed.

4. The combination with two adjacent conveyors, of a transferring member, a traveling support for the transferring member, means for moving the member upon the support from one conveyor to the other, a clutch through which the transferring member is moved, a retaining member for an element of the clutch, and controlling means for the retaining member including an element traveling with the support.

5. The combination with two adjacent conveyors, of a transferring member, a traveling support for the transferring member, means for moving the member upon the support from one conveyor to the other, a clutch through which the transferring member is moved, a retaining member for an element of the clutch, a controlling member traveling with the support and movable by the conveyed articles, and flexible connections between the controlling member and the retaining member.

6. The combination with two adjacent conveyors, of means for moving the conveyors in opposite directions, a movable transferring member, means for moving the member from one conveyor to the other, means for moving the member longitudinally of a conveyor, a clutch through which the transferring member is moved from one conveyor to the other, controlling mechanism for the clutch, a latch for the controlling mechanism, a member movable with the transferring member along a conveyor and arranged to receive contact of conveyed articles, and connections between the contact member and the latch and actuated by said contact member for moving said latch in different positions of said member relative to the conveyor.

7. The combination with two adjacent conveyors, of means for moving the conveyors in opposite directions, a transferring member, means for moving the transferring member longitudinally of the conveyors, means for moving the member from one conveyor to the other, a clutch through which the transferring member is moved, controlling mechanism for an element of the clutch, a latch for the controlling mechanism, a member movable upon the transferring member and arranged to receive contact of conveyed articles, and connections between the contact member and the latch for moving said latch.

8. The combination with conveyors arranged side by side one of which delivers to another, the conveyors having separated article-receiving spaces, the delivering conveyor being normally at rest, of means for moving the conveyors longitudinally step-by-step, each step corresponding to a dimension of the articles being transferred to bring separated spaces of the conveyors into laterally coincident alignment for transfer of articles therebetween, and means governed by an article on the receiving conveyor for starting the action of the moving means for the delivering conveyor.

9. The combination with two conveyors arranged side by side, of means for transferring articles from one conveyor to the other, conveyor-controlling means associated with the receiving conveyor for intermittently moving the receiving conveyor to cause the advance thereby of transferred articles, separate means for respectively operating the transferring and conveyor-controlling means, members co-operating with the conveyors and arranged for movement by conveyed articles, and controlling connections between the members and the separate operating means.

10. In a shoe transferring system, a pair of conveyors having the receiving extremity of one conveyor and the delivering extremity of the other conveyor connected with, operating positions and the first-mentioned conveyor delivering to the other conveyor, means for moving the conveyors in opposite directions, means for supplying shoe containers to the receiving end of one of the conveyors, all of said shoe-containers being maintained continuously upon said conveyors during travel between the receiving extremity of one conveyor and the delivering extremity of the other conveyor, and means located adjacent the delivering extremity of said last-mentioned conveyor and controlled by engagement of the containers therewith for governing the movement of said containers.

11. The combination with conveyors arranged side by side and having series of separated projections similarly spaced from one another to receive between adjacent projections the articles to be conveyed, of means for moving the conveyors in opposite directions in steps corresponding to the distance between adjacent projections, and means for transferring articles directly between laterally coincident spaces of the conveyors at selected points including those intermediate the ends of said conveyors.

12. The combination with a conveyor, of a reciprocatory actuating member, a wheel connected to the conveyor for engagement by the actuating member, a disengaging member in contact with which the actuating member may reciprocate out of engagement with the wheel, and means controlled by articles under the influence of the conveyor for moving the disengaging member.

13. In a shoe-transferring system, a plurality of endless conveyors, one of said conveyors being arranged to receive all of the transferred articles and to transfer articles directly between two shoe-making sections, other conveyors arranged to temporarily store articles received from the first section, means for automatically directing articles from the first conveyor to one storage-conveyor, means for transferring articles from such storage-conveyor to another storage-conveyor, and means for effecting a delivery of all of the stored articles from the storage-conveyors to the first-mentioned conveyor approximately at the second section.

14. The combination with a conveyor, of means for removing articles from one portion of the conveyor, means for returning the removed articles to another portion of the conveyor, a member movable into co-operation with the conveyor to separate the removed and returned articles, and means normally disconnected from said member and movable into operative relation therewith for moving the member and thereafter moving out of operative relation therewith, thereby losing control of said member after the movement has been initiated.

15. The combination with a conveyor, of means for removing articles from one portion of the conveyor, means for returning said removed articles to another portion of the conveyor, a member movable into co-operation with the conveyor between the point of removal and return to separate the removed and returned articles, and means controlled as a result of an accumulation of articles on the receiving conveyor for moving the member into separating relation between the points of removal and return.

16. In a storage apparatus, the combination with a receiving conveyor, of a storage-conveyor leading from the receiving conveyor, a storage-conveyor leading to the receiving conveyor, said storage-conveyors extending side by side transversely by the receiving conveyor, a gate movable into co-operation with the receiving conveyor between the storage-conveyors, means for transferring articles from the receiving conveyor to the outgoing storage-conveyor, and means carried by the transferring means for moving the gate.

17. In a storage apparatus, the combination with a receiving conveyor, of a storage-conveyor leading from the receiving conveyor, a storage-conveyor leading to the receiving conveyor, a gate pivoted beside the receiving conveyor to move into co-operation with it, a traveling member arranged to transfer articles from the receiving conveyor to the outgoing storage-conveyor, and a projection from the traveling member arranged to contact with and actuate the gate.

18. In a storage apparatus, a receiving conveyor to which articles are supplied and which leads to an operating position, a storage-conveyor, and means controlled by an accumulation of articles on the receiving conveyor for transferring articles from the outgoing end of the receiving conveyor to the storage-conveyor and from the storage-conveyor to the incoming end of the receiving conveyor.

19. In a storage apparatus, a receiving conveyor to which articles are supplied, a storage-conveyor, means governed by an accumulation of articles on the receiving conveyor for transferring articles from the outgoing end of the receiving conveyor to the storage conveyor, and means governed by the articles on the incoming end of the receiving conveyor for transferring articles from the storage-conveyor to the receiving conveyor.

20. In a storage apparatus, a receiving conveyor arranged to advance articles from one end thereof directly to the other end thereof for discharge at said last-mentioned end, two storage-conveyors associated with the receiving conveyor, means for operating the storage conveyors in opposite directions, means movable across the receiving conveyor to a storage conveyor for transferring articles from the receiving conveyor to said storage-conveyor, means for transferring said articles from the last-mentioned storage-conveyor to the companion storage-conveyor, the movement of the companion storage-conveyor transferring the articles to the receiving conveyor.

21. In a storage apparatus, a receiving conveyor arranged to advance articles from one end thereof directly to the other end for discharge at said last-mentioned end, two storage-conveyors associated with the receiving conveyor, one of said storage-conveyors receiving articles directly from the other, means for operating the storage-conveyors in opposite directions, and means for controlling the travel of both storage conveyors governed by articles on the receiving conveyor.

22. In a storage apparatus, a receiving conveyor, a storage-conveyor leading from the outgoing end of the receiving conveyor, controlling means for said storage-conveyor governed by articles upon the outgoing end of the receiving conveyor, a storage-conveyor leading to the incoming end of the receiving conveyor, one of said storage-conveyors receiving articles directly from the other, and controlling means for the second-mentioned storage-conveyor governed by articles upon the incoming end of the receiving conveyor.

23. In combination, article-moving means, a movable transferring member co-operating therewith, operating means for the moving means, a shiftable fulcrum for the transferring member, and means controlled upon resistance offered by the articles to movement of the transferring member for shifting the fulcrum of the transferring member and rendering the operating means effective to cause action of the moving means.

24. In combination, a conveyor, two article-transferring members co-operating therewith, one of said members being arranged to move articles off of the conveyor, operating means for the last-mentioned member, the other member being arranged to feed articles to the conveyor, and connections from said operating means to the other member effective only when movement of said other member is resisted by an accumulation of articles upon the conveyor to govern the operating means and cause movement of said article-removing member.

25. In a storage apparatus, a storage-conveyor, an article-supporting member arranged adjacent the storage-conveyor and from which articles are delivered to said storage-conveyor, a transferring member movable to advance articles on the supporting member toward the storage-conveyor but arranged for retention against movement by accumulated articles, means for operating the conveyor, and means controlled by the transferring member when retained by the accumulated articles for governing the operating means to move the storage-conveyor.

26. In combination, a conveyor, a transferring member movable to advance articles toward the conveyor, a member for removing articles from the conveyor, means for operating the article-removing member, and a continuous chain of connected elements connected to and controlled by the transferring member and extending to and governing the article-removing member.

27. In combination, a conveyor, a transferring member movable to advance articles toward the conveyor, a member for removing articles from the conveyor, means for operating the conveyor, means for operating the article-removing member, and a continuous chain of connected elements connected to and controlled by the transferring member when movement of said transferring member is resisted by an accumulation of articles on the conveyor for governing the operating means for the article-removing member.

28. In combination, a conveyor, a transferring member movable to advance articles toward the conveyor, a member arranged to travel over the conveyor in one direction and to remove articles therefrom by movement in another direction, the directions of travel and of movement of said member being at an angle to each other and means controlled by the transferring member for governing the travel of the article-removing member.

29. In combination, an oscillatory lever, an article-transferring member movable thereby, a shifting fulcrum for the lever, article-moving means associated with the transferring member, operating means for the article-moving means, and controlling connections between the lever-fulcrum and the operating means.

30. In combination, an oscillatory lever, an article-transferring member movable thereby, a shifting fulcrum for the lever, a second article-transferring member to which the first-mentioned member delivers, operating means for the second article-transferring member, and controlling connections between the lever-fulcrum and operating means.

31. In combination, an oscillatory lever, an article-transferring member movable thereby, a shifting fulcrum for the lever, a conveyor associated with the transferring member, operating means for the conveyor, and controlling connections between the lever-fulcrum and operating means.

32. In combination, an oscillatory lever, an article-transferring member movable thereby, a shifting fulcrum for the lever, a conveyor associated with the transferring member, a second transferring member associated with the conveyor, operating means for the conveyor and the second transferring member, and controlling connections between the lever-fulcrum and operating means.

33. In storage apparatus, substantially parallel conveyors operating in opposite directions, a transferring member, automatic means extending transversely of both conveyors and responsive to the presence or absence of articles on the conveyors for moving the transferring member longitudinally of both conveyors, and automatic means responsive to the presence or absence of articles on the conveyors for moving the transferring member transversely of the conveyors to effect the transfer of the articles from one conveyor to the other, such longitudinal and transverse movements of the transferring member occurring at different times.

34. In a storage apparatus, adjacent conveyors, a transferring member, means for moving the transferring member longitudinally for substantially the entire length of both conveyors, means for moving the transferring member transversely of the conveyors at a plurality of points in such longitudinal travel, and means acting only in the transverse travel of the transferring member for causing reverse movement of the transferring member.

35. The combination with a conveyor, of means for testing the space adjacent to the conveyor to determine the presence or absence of articles thereon, a movable transferring member associated with the conveyor, mechanism for moving the transferring member, mechanism for advancing the transferring member along the conveyor, mechanism for returning the transferring member along said conveyor, controlling connections between the testing means and mechanism for moving the transferring member, and controlling connections between the returning mechanism and mechanism for moving the transferring member.

36. In a storage apparatus, adjacent conveyors, a transferring member, means for moving the transferring member longitudinally of the conveyors, means for moving the transferring member transversely of a conveyor of the adjacent conveyors to effect the transfer of the articles between them, means movable with the transferring member for testing the space over a conveyor of the adjacent conveyors, and means controlled by the testing means for governing movement of the transferring member.

37. In a storage apparatus, adjacent conveyors, a transferring member, means for moving the transferring member longitudinally of the conveyors, means for moving the transferring member transversely of a conveyor of the adjacent conveyors to effect the transfer of the articles between them, means movable with the transferring member longitudinally of the conveyors for testing the space over a conveyor of the adjacent conveyors, and means controlled by the testing means for governing the transverse moving means.

38. In a storage apparatus, adjacent conveyors, means for advancing the conveyors in opposite directions, a carriage movable longitudinally of and extending across the conveyors, a transferring member movable upon the carriage across one of the conveyors, a member movable upon the carriage and arranged to test the space over the other conveyor, and means controlled by the testing member for governing the movement of the member upon the carriage.

39. In a storage apparatus, adjacent conveyors, a transferring member, means for moving the transferring member longitudinally of the conveyors, means for moving the transferring member transversely of a conveyor of the adjacent conveyors to effect the transfer of the articles between them, means movable with the transferring member for testing the space over a conveyor of the adjacent conveyors, means controlled by the testing means for governing the movement of the transferring member, and means for rendering the testing means effective at definite intervals.

40. In a storage apparatus, adjacent conveyors, means for delivering articles, a transferring member, means for moving the transferring member longitudinally of the conveyors, means for moving the transferring member transversely of a conveyor of the adjacent conveyors to effect the transfer of the articles between them, means movable with the transferring member for testing the space over a conveyor of the adjacent conveyors, means controlled by the testing means for governing the movement of the transferring member, and means for rendering the testing means effective once for each article delivered.

41. In a storage apparatus, adjacent conveyors, a transferring member, means for moving the transferring member longitudinally of the conveyors, means for causing reverse movement of the transferring member, means for moving the transferring member transversely of a conveyor of the adjacent conveyors to effect the transfer of the articles between them, means movable with the transferring member for testing the space over a conveyor of the adjacent conveyors, and means controlled by the testing means for governing the reverse moving means.

42. In a storage apparatus, adjacent conveyors, a transferring member, means for moving the transferring member longitudinally of the conveyors, means for causing reverse movement of the transferring member, means for moving the transferring member transversely of a conveyor of the adjacent conveyors to effect the transfer of the articles between them, means movable with the transferring member for testing the space over a conveyor of the adjacent conveyors, means controlled by the testing means for governing the transverse moving means, and means controlled by the transverse moving means for governing the reverse moving means.

43. In a storage apparatus, adjacent conveyors, means for advancing the conveyors in opposite directions, a carriage movable longitudinally of the conveyors, operating mechanism for producing such longitudinal movement, a transferring member movable upon the carriage transversely of a conveyor, operating mechanism for producing the transverse movement upon the carriage, a feeler pivoted upon one extremity of the carriage, means for moving the feeler upon the carriage at definite intervals, and controlling connections between the feeler and the transverse moving mechanism.

44. In a storage apparatus, adjacent conveyors, means for advancing the conveyors in opposite directions, a carriage movable longitudinally of the conveyors, operating mechanism for producing such longitudinal movement, mechanism for producing the reverse longitudinal movement, a transferring member movable upon the carriage transversely of a conveyor, operating mechanism for producing the transverse movement of the member upon the carriage, a feeler pivoted upon one extremity of the carriage, means for moving the feeler upon the carriage at definite intervals, controlling connections between the feeler and the transverse moving mechanism, and controlling connections between the transverse moving mechanism and the reverse moving mechanism.

45. The combination with a conveyor, of a transferring member movable along the conveyor, operating mechanism for the transferring member, a testing member movable with the transferring member, and flexible connections between the testing member and operating mechanism and along which the transferring member travels.

46. The combination with a conveyor, of a transferring member movable along the conveyor, operating mechanism for the transferring member, a testing member movable with the transferring member and independently thereof, controlling connections between the testing member and operating mechanism, and means for moving the testing member into testing position, said means including a flexible connection along which the transferring member travels.

47. The combination with a conveyor, of a carriage movable along the conveyor, a feeler movable upon the carriage and co-operating with the conveyor, operating mechanism for the carriage, flexible connections between the feeler and mechanism, an intermittently moving operating member, and flexible connections to the operating member, said connections acting upon the feeler.

48. The combination with a conveyor, of a carriage movable along the conveyor, a feeler movable upon the carriage and co-operating with the conveyor, a lever joined to the feeler, operating mechanism for the carriage, an intermittently moving operating member, and flexible connections to fixed points and to the operating mechanism and member, respectively, one of said connections engaging the feeler and another connection engaging the lever.

49. In a transferring system, a movable transferring member, operating mechanism therefor including oscillatory driving and driven members, means for oscillating one of the members, a pawl carried upon one of the members and arranged for positive driving engagement with the other, operating connections between the driven member and transferring member, and means movable by an element of the transferring system for controlling the engagement of the pawl.

50. In a transferring system, a movable transferring member, operating mechanism therefor including a driven member, an oscillatory driving member, means for oscillating the driving member, a pawl carried by the driving member for engagement with the driven member, operating connections between the driven member and transferring member, a lever normally maintaining the pawl out of engagement with the driven member, a flexible member connected to the lever, and a movable member in the transferring system to which the flexible member is joined.

51. In a transferring system, a conveyor, a transferring device cooperating with the conveyor, a movable actuating member for the conveyor, a movable driving member for the transferring device, means common to the members for moving the members, means for reversing the movement of one of the members while the other remains at rest, and connections to an element of the moving means and movable thereby for controlling the action of the reversing means.

52. In a transferring system, a conveyor, a carriage movable along the conveyor, a transferring member movable upon the carriage, means for thus moving the transferring member, operating mechanism for moving the conveyor and carriage in one direction including oscillatory driving means provided with a pawl, connections from the driving means to the carriage, an actuating member for the conveyor engaged by the pawl, means for moving the carriage oppositely to the movement produced by the driving means, and means for controlling the opposite movement of the carriage from the moving means for the transferring member.

53. In a transferring system, a conveyor, a carriage movable along the conveyor, a transferring member movable upon the carriage, a shaft to which the conveyor is connected, a disk fixed to the shaft, a sleeve surrounding the shaft, means for rotating the sleeve, a pawl carried by the sleeve and engaging the disk, and connections between the sleeve and carriage.

54. In a transferring system, a conveyor, a carriage movable along the conveyor, a transferring member movable upon the carriage, a shaft to which the conveyor is connected, a disk fixed to the shaft, a sleeve surrounding the shaft, means for rotating the sleeve, a pawl carried by the sleeve and engaging the disk, connections between the sleeve and carriage, a second sleeve surrounding the first-mentioned sleeve, means for turning the outer sleeve upon the inner sleeve, and connections between the sleeves arranged to turn the inner from the outer.

55. In a transferring system, a conveyor, a carriage movable along the conveyor, a transferring member movable upon the carriage, a shaft to which the conveyor is connected, a disk fixed to the shaft, a sleeve surrounding the shaft, means for rotating the sleeve, a pawl carried by the sleeve and engaging the disk, connections between the sleeve and carriage, a second sleeve surrounding the first-mentioned sleeve, a drum secured to the outer sleeve, a weight acting upon the drum, a pawl arranged to connect the outer sleeve to the inner for rotation of the latter under the influence of the weight, and a retaining detent for the drum.

56. In a transferring system, a conveyor, a carriage movable along the conveyor, a transferring member movable upon the carriage, means for moving the transferring member, a shaft to which the conveyor is connected, a disk fixed to the shaft, a sleeve surrounding the shaft, means for rotating the sleeve, a pawl carried by the sleeve and engaging the disk, connections between the sleeve and carriage, a second sleeve surrounding the first-mentioned sleeve, a drum secured to the outer sleeve, a weight acting upon the drum, a pawl arranged to connect the outer sleeve to the inner for rotation of the latter under the influence of the weight, a retaining detent for the drum, and controlling connections between the moving means for the transferring member and the detent.

57. In a transferring system, a conveyor, a carriage movable along the conveyor, a transferring member movable upon the carriage, a shaft to which the conveyor is connected, a disk fixed to the shaft, a sleeve surrounding the shaft, means for rotating the sleeve, a pawl carried by the sleeve and engaging the disk, connections between the sleeve and carriage, a second sleeve surrounding the first-mentioned sleeve, a drum secured to the outer sleeve, a weight acting upon the drum, a pawl arranged to connect the outer sleeve to the inner for rotation of the latter under the influence of the weight, and a retaining detent for the drum, the detent being arranged to control the last mentioned pawl.

58. The combination with an article-conveyor, of operating mechanism for the conveyor, an article-testing member arranged for testing the presence of articles in a space at the incoming end of the conveyor, and means controlled by the testing member for governing the operating mechanism to move the conveyor and transfer articles to the space when no articles are encountered by the testing member when testing said space.

59. The combination with an article conveyor, of operating mechanism for the conveyor, an article-testing member arranged for testing the presence of articles in a space at the incoming end of the conveyor, controlling connections between the testing member and operating mechanism, said connections causing the operating mechanism to move the conveyor and transfer articles to the space when no articles are encountered by the testing member when testing said space, and means for rendering the testing member effective at predetermined intervals to control the operating mechanism.

60. In a storage system, a storage-conveyor, operating mechanism therefor, a receiving conveyor extending across the incoming end of the storage-conveyor and to a portion of which said storage-conveyor delivers, a feeler governed by the delivery of articles from the storage-conveyor upon a portion of the receiving conveyor, means for delivering articles from another portion of the receiving conveyor to the storage-conveyor, and controlling connections between the feeler and operating mechanism.

61. In a storage system, a storage-conveyor, operating mechanism therefor, a receiving conveyor extending across the incoming end of the storage conveyor, a feeler governed by articles upon the receiving conveyor, controlling connections between the feeler and operating mechanism, a member arranged to hold the feeler in an inoperative position, means for moving said member away from the feeler, and means effective upon said movement of the member to cause operative movement of the feeler to make a test for articles on the conveyor.

62. In a storage system, a storage-conveyor, operating mechanism therefor, a receiving conveyor extending across the incoming end of the storage-conveyor, a feeler pivoted beside the receiving conveyor opposite the end of the storage-conveyor, a flexible member connecting the feeler and operating mechanism, a member contacting with the feeler to hold it out of the path of articles upon the receiving conveyor, and means for intermittently moving the member to free the feeler.

63. The combination with a conveyor, of a movable member arranged for contact with articles carried by the conveyor, retaining means for the member in position for contact by the articles and releasing said member by such contact of the articles, means for delivering articles from the conveyor, operating mechanism for the delivering means, and controlling connections between the member and operating mechanism.

64. The combination with a conveyor, of a movable member into co-operation with which articles are carried by the conveyor, retaining means for the member releasing said member upon contact with the retaining means of the articles, means for delivering articles from the conveyor, operating mechanism for the delivering means, and connections through which the member upon its release by the retaining means controls the operating mechanism.

65. The combination with a conveyor, of a movable member into co-operation with which articles are carried by the conveyor, means for normally retaining the member out of effective engagement with the conveyed articles, said retaining means being arranged for movement by the articles to release the member, means for delivering articles from the conveyor, operating mechanism for the delivering means, and connections between the member and operating mechanism.

66. The combination with a conveyor, of a movable member into co-operation with which articles are carried by the conveyor, means for normally retaining the member out of effective engagement with the conveyed articles, said retaining means being arranged for movement by the articles to release the member, means for resetting the member, means for delivering articles from the conveyor, operating mechanism for the delivering means, and connections between the member and operating mechanism.

67. The combination with a storage-conveyor, of a receiving conveyor arranged to receive articles at its outgoing end and extending across and beyond the storage-conveyor, said receiving conveyor being arranged to advance articles from its outgoing end directly to its delivery end, means for transferring articles from the receiving conveyor to the storage-conveyor, means for transferring said articles from the storage-conveyor to the receiving conveyor at a point beyond the point of transfer from the receiving conveyor to the storage-conveyor, and means for delivering articles from the receiving conveyor at a point beyond that at which articles are transferred from the storage-conveyor to said receiving conveyor.

68. The combination with a receiving conveyor, of means for feeding unit-articles thereto, means for causing the accumulation of the unit-articles one by one upon the receiving conveyor in groups, a storage-conveyor, means for transferring the accumulated groups from the receiving conveyor to the storage-conveyor, a second storage-conveyor, means for advancing the storage-conveyors in opposite directions, and means for transferring the groups from the first to the second storage-conveyor, the second storage-conveyor delivering the stored groups to the receiving conveyor near the extremity opposite that to which the unit-articles are fed.

69. The combination with a receiving conveyor, of means for feeding unit-articles thereto, means for causing the accumulation of the unit-articles one by one upon the receiving conveyor in groups, a storage-conveyor, means for transferring the accumulated groups from the receiving conveyor to the storage-conveyor, a second storage-conveyor, means for advancing the storage-conveyors in opposite directions, means for transferring the groups from the first to the second storage-conveyor, the second storage-conveyor delivering the stored groups to the receiving conveyor near the extremity opposite that to which the unit-articles are fed, and means made effective by the absence of articles from the receiving conveyor at the end of the second storage-conveyor for advancing said second storage-conveyor.

70. The combination with a delivering conveyor, of a conveyor receiving such delivery, a member movable to transfer articles from the delivering to the receiving conveyor, and means rendered active by the absence of articles from a space upon the receiving conveyor for moving the transferring member.

71. The combination with adjacent conveyors, of a member movable to transfer articles from one conveyor to another, a feeler associated with the receiving conveyor to which articles are to be transferred, means for moving the feeler for contact with articles upon the receiving conveyor, and means rendered active by entrance of the feeler into a space left vacant upon the receiving conveyor for moving the transferring member.

72. The combination with adjacent conveyors, of a member movable to transfer articles from one conveyor to another, means for advancing the conveyor from which articles are delivered, a feeler associated with the receiving conveyor to which articles are to be transferred, connections to the conveyor-advancing means for moving the feeler for contact with articles upon the receiving conveyor, and means rendered active by entrance of the feeler into a space left vacant upon the receiving conveyor for moving the transferring member.

73. The combination with adjacent conveyors, of a member movable to transfer articles from one conveyer to another, a feeler associated with the receiving conveyor to which articles are to be transferred, means for moving the feeler for contact with articles upon the receiving conveyor, operating mechanism for the transferring member, and connections to the feeler for controlling said operating mechanism.

74. The combination of adjacent conveyors, of a carriage extending across said conveyors and movable longitudinally thereof, a transferring member mounted to reciprocate on the carriage, and means controlled by the absence of articles from one of the conveyors in proximity to the carriage for governing the reciprocation of the transferring member.

75. The combination with a delivering conveyor, of a receiving conveyor, means for advancing the conveyors in opposite directions, a carriage extending across said conveyors and movable longitudinally thereof, operating mechanism for the carriage, a transferring member mounted to reciprocate upon the carriage, and connections to the means for advancing the delivering conveyor for controlling the operating mechanism.

76. The combination with a delivering conveyor, of a receiving conveyor, means for advancing the conveyors in opposite directions, a carriage extending across said conveyors and movable longitudinally thereof, operating mechanism for the carriage, a transferring member mounted to reciprocate upon the carriage, mechanism for reciprocating the transferring member, means controlled by the absence of articles upon the receiving conveyor adjacent to the carriage for governing the reciprocating mechanism, and connections to the means for advancing the delivering conveyor for controlling the operating mechanism.

77. The combination with a delivering conveyor, of a receiving conveyor, means for advancing the conveyors in opposite directions, a carriage extending across said conveyors and movable longitudinally thereof, means for advancing the carriage step by step in the same direction as the delivering conveyor, a transferring member mounted to reciprocate upon the carriage, and automatic means for causing the reciprocation of the transferring member in different positions of the carriage.

78. The combination with a delivering conveyor, of a receiving conveyor, means for advancing the conveyors in opposite directions, a carriage extending across said conveyors and movable longitudinally thereof, means for advancing the carriage step by step in the same direction as the delivering conveyor, a transferring member mounted to reciprocate upon the carriage, operating mechanism for the transferring member, a feeler movable upon the carriage for contact with articles upon the receiving conveyor, and controlling connections from the feeler to the operating mechanism.

79. The combination with adjacent conveyors, of transferring means bodily movable relative to the conveyors and having a movable article-transferring member co-operating with the conveyors, operating mechanism for the transferring member, a feeler movable with the transferring means and upon said transferring means to test a space for an article on one of the conveyors, and connections attached directly to the feeler and actuated thereby in its movement upon the transferring means for controlling the operating mechanism.

80. The combination with a delivering conveyor, of a receiving conveyor, means for advancing the conveyors in opposite directions, a carriage extending across said conveyors and movable longitudinally thereof, operating mechanism for the carriage, a transferring member mounted to reciprocate upon the carriage, mechanism for reciprocating the transferring member, a feeler movable upon the carriage, and connections to the feeler for controlling the reciprocating mechanism.

81. The combination with a delivering conveyor, of a receiving conveyor, means for advancing the conveyors in opposite directions, a carriage extending across said conveyors and movable longitudinally thereof, operating mechanism for the carriage, a transferring member mounted to reciprocate upon the carriage, mechanism for reciprocating the transferring member, a feeler movable upon the carriage, connections to the feeler for moving it toward and from one of the conveyors to test for articles thereon, and connections to the feeler for controlling the reciprocating mechanism.

82. The combination with a receiving conveyor, of a conveyor delivering thereto, operating mechanism for the delivering conveyor, a feeler movable above the receiving conveyor, means for moving the feeler periodically to test the space at the end of the delivering conveyor, and connections to the feeler for controlling the operating mechanism.

83. The combination with a receiving conveyor, of a conveyor delivering thereto, operating mechanism for the delivering conveyor, a feeler movable above the receiving conveyor, means for moving the feeler periodically to test the space at the end of the delivering conveyor, and connections to the feeler made effective when the feeler enters said space to render the operating mechanism active.

84. The combination with a receiving conveyor, of a conveyor delivering thereto, operating mechanism for the delivering conveyor, a feeler movable above the receiving conveyor, a contact member normally holding the feeler ineffective, means for freeing the feeler from the contact member, and connections to the feeler for controlling the operating mechanism.

85. The combination with a receiving conveyor, of a conveyor delivering thereto, operating mechanism for the delivering conveyor, a member for feeding articles to be conveyed, operating mechanism for the feeding member, a feeler movable above the receiving conveyor, means governed by operating mechanism of the feeding member for moving the feeler periodically to test the space at the end of the delivering conveyor, and connections to the feeler for controlling the conveyor-operating mechanism.

ERASTUS E. WINKLEY.

CERTIFICATE OF CORRECTION.

Patent No. 1,978,004. October 23, 1934.

ERASTUS E. WINKLEY.

It is hereby certified that error appears in the printed specification of the the above numbered requiring correction as follows: Page 3, lines 119 and 120, for "respective latches 186 and 187 exercises 128 or 120, with the associated latch" read latches 186 and 187 exercises with the respective associated latch 128 or 120; and that the said Letters Patent should be read with this correction therein that the same may conform to the record of the case in the Patent Office.

Signed and sealed this 5th day of March, A. D. 1935.

Leslie Frazer (Seal) Acting Commissioner of Patents.